(12) United States Patent
Polk, Jr. et al.

(10) Patent No.: US 11,780,745 B2
(45) Date of Patent: *Oct. 10, 2023

(54) SOLAR DISTILLATION SYSTEM WITH SUPPLEMENTAL DISTILLATION UNITS AND ASSOCIATED METHODS

(71) Applicant: D & D MANUFACTURING LLC, Merritt Island, FL (US)

(72) Inventors: Dale E. Polk, Jr., Merritt Island, FL (US); Karl Leslie Polk, Merritt Island, FL (US)

(73) Assignee: D & D MANUFACTURING LLC, Merrit Island, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,499

(22) Filed: May 9, 2022

(65) Prior Publication Data

US 2022/0259073 A1 Aug. 18, 2022

Related U.S. Application Data

(63) Continuation of application No. 16/907,434, filed on Jun. 22, 2020, now Pat. No. 11,325,846.

(51) Int. Cl.
*C02F 1/14* (2023.01)
*C02F 1/08* (2023.01)
(Continued)

(52) U.S. Cl.
CPC .............. *C02F 1/14* (2013.01); *B01D 1/0035* (2013.01); *C02F 1/08* (2013.01); *C02F 2103/08* (2013.01); *C02F 2301/063* (2013.01)

(58) Field of Classification Search
CPC .......... C02F 1/08; C02F 1/14; C02F 2103/08; C02F 2301/063; B01D 1/0035
See application file for complete search history.

(56) References Cited

U.S. PATENT DOCUMENTS 2,803,591 A * 8/1957 Coanda .................. C02F 1/047
126/690
3,300,393 A * 1/1967 Fisher ....................... B01D 1/16
159/43.1
(Continued)

FOREIGN PATENT DOCUMENTS

DE          8424789       7/1986
DE       102009018041    10/2010
(Continued)

OTHER PUBLICATIONS

"About Aqua4 Technology" WaterfX: http://waterfx.co/aqua4; retrieved from internet May 18, 2015, 2 pgs. ** See U.S. Appl. No. 16/907,434.
(Continued)

*Primary Examiner* — Jonathan Miller
(74) *Attorney, Agent, or Firm* — Allen, Dyer, Doppelt + Gilchrist, PA

(57) ABSTRACT

A solar distillation system includes at least one solar panel configured to reflect sunlight, and a distillation tube adjacent the at least one solar panel that is to receive a liquid to be processed into fresh water. The liquid flows through the distillation tube and is heated by the reflected sunlight. At least one supplemental distillation unit is connected to the distillation tube and has at least one curved surface to receive the reflected sunlight. The least one supplemental distillation unit includes a plurality of sprayers configured to spray the liquid onto the at least one curved surface to be further processed into fresh water.

21 Claims, 20 Drawing Sheets

(51) Int. Cl.
*B01D 1/00* (2006.01)
*C02F 103/08* (2006.01)

(56) References Cited

U.S. PATENT DOCUMENTS

| | | | | |
|---|---|---|---|---|
| 3,994,278 | A | * | 11/1976 | Pittinger ............... F24S 60/30 |
| | | | | 126/621 |
| 4,053,368 | A | | 10/1977 | Courvoisier et al. |
| 4,142,678 | A | * | 3/1979 | Bottum ................. F24S 10/60 |
| | | | | 62/235.1 |
| 4,194,949 | A | | 3/1980 | Stark |
| 4,227,970 | A | * | 10/1980 | Howell, Jr. ............ C02F 1/14 |
| | | | | 202/266 |
| 4,235,679 | A | | 11/1980 | Swaidan |
| 4,318,781 | A | | 3/1982 | Iida |
| 4,329,204 | A | | 5/1982 | Petrek et al. |
| 4,343,683 | A | | 8/1982 | Diggs |
| 4,469,938 | A | * | 9/1984 | Cohen ................. G01S 3/7861 |
| | | | | 126/696 |
| 4,504,362 | A | * | 3/1985 | Kruse ..................... F24S 30/40 |
| | | | | 202/180 |
| 4,680,090 | A | | 7/1987 | Lew |
| 6,342,127 | B1 | | 1/2002 | Possidento |
| 6,821,395 | B1 | | 11/2004 | Ward |
| 8,580,085 | B2 | | 11/2013 | Kemp |
| 8,613,839 | B2 | | 12/2013 | Maisotsenko et al. |
| 8,613,840 | B1 | * | 12/2013 | Alayoub .............. B01D 1/0035 |
| | | | | 126/714 |
| 8,951,391 | B2 | | 2/2015 | McClure |
| 9,187,341 | B2 | * | 11/2015 | Kerschgens ......... B01D 5/0087 |
| 10,183,872 | B2 | * | 1/2019 | Wang .................... B01D 5/006 |
| 11,285,400 | B2 | * | 3/2022 | Polk, Jr. ................. B01D 3/146 |
| 11,325,846 | B2 | * | 5/2022 | Polk, Jr. .................... C02F 1/08 |
| 2003/0150704 | A1 | * | 8/2003 | Posada ................... F24S 23/30 |
| | | | | 203/1 |
| 2007/0193870 | A1 | | 8/2007 | Prueitt |
| 2008/0073198 | A1 | | 3/2008 | Simon |
| 2011/0048921 | A1 | | 3/2011 | Cap et al. |
| 2012/0318658 | A1 | | 12/2012 | Hong |
| 2014/0042009 | A1 | | 2/2014 | Huang et al. |
| 2015/0329378 | A1 | * | 11/2015 | Polk, Jr. .................... C02F 1/14 |
| | | | | 203/10 |
| 2015/0344325 | A1 | * | 12/2015 | Broeckelmann ........ F24S 23/74 |
| | | | | 202/184 |
| 2018/0169541 | A1 | | 6/2018 | Anderson |

FOREIGN PATENT DOCUMENTS

| | | |
|---|---|---|
| GB | 1467472 | 3/1977 |
| GB | 2469321 | 10/2010 |
| JP | 52-142673 | 11/1977 |
| JP | 56-147679 | 11/1981 |
| WO | WO2006077593 | 7/2006 |
| WO | WO2009065407 | 5/2009 |

OTHER PUBLICATIONS

WaterfX: http://waterfx.co; retrieved from internet May 18, 2015, 1 pg. ** See U.S. Appl. No. 16/907,434.

Hamed, et al., "Prospects of Improving Energy Consumption of the Multi-Stage Flash Distillation Process" Saline Water Conversion Corporation Proceedings of the Fourth Annual Workshop on Water Conservation in the Kingdom, Dhahran, Apr. 23-25, 2001; pp. 14. ** See U.S. Appl. No. 16/907,434.

Tham, "Distillation, an introduction," accessed on the Internet at tps://aussiedistiller.com.au/books/Chocaholic/Introduction%20to%20Distillation.pdf on Jul. 8, 2018, 39 pages. 2006 ** See U.S. Appl. No. 16/907,434.

* cited by examiner

SOLAR DISTILLATION SYSTEM WITH SUPPLEMENTAL DISTILLATION UNITS AND ASSOCIATED METHODS

RELATED APPLICATION

This application is a continuation of U.S. application Ser. No. 16/907,434 filed Jun. 22, 2020, which is hereby incorporated herein in its entirety by reference.

TECHNICAL FIELD

The present disclosure relates to water treatment, and, more particularly, to the distillation of water using solar power.

BACKGROUND

Fresh water is a critical need in many parts of the world. Other contaminated water or liquid, such as oil field frac water and industrial waste water, also needs to be processed before being disposed. A number of different methods have been developed for processing seawater or other contaminated water that is not portable to provide fresh water.

One approach is to use settling and filtration systems to remove relatively large impurities from the seawater or contaminated water. Filtration is also capable of removing smaller contaminants down to the size of bacteria, and perhaps even smaller particulates in certain cases. However, filtration systems capable of removing contaminants down to ionic size are quite costly, both in terms of manufacture and in maintenance as well.

An alternative method of water purification is distillation. Distillation works well in the removal of virtually all impurities from water. Distillation is used in many areas for the desalination of seawater. However, most distillation processes require considerable heat to produce sufficient evaporation since the water is heated to boiling to accelerate the evaporation process. This is particularly true of large-scale distilling operations.

Passive sources of energy (e.g., solar energy) have been developed to produce the required heat for evaporation. One approach for a solar-powered distillation system to produce fresh water from seawater is disclosed in U.S. Pat. No. 8,613,840. The solar-powered distillation system includes a heat-absorbent evaporation panel having mutually opposed evaporation surfaces. The panel is contained within a housing. Each side of the housing includes a lens panel. The lenses of each panel focus solar energy onto the respective surfaces of the evaporation panel. A mirror is positioned to each side of the housing to reflect solar energy onto the respective lens panels. Contaminated water enters the top of the housing to run down the surfaces of the evaporation panel. A fresh water collection pipe extends from the top of the housing to a collection tank. A scraper mechanism removes salt and/or other residue from the surfaces of the evaporation panel to allow the residue to be removed periodically from the bottom of the housing.

Another approach for a solar-powered distillation system is provided by WaterFX. Solar troughs reflect sunlight to a pipe filled with a heat transfer fluid (HTF), such as mineral oil. The heated mineral oil powers a heat pump. The heat is fed to a multi-effect or multi-stage distillation system that evaporates freshwater from the seawater or contaminated water. The multi-effect approach to evaporating freshwater is efficient since each stage essentially reuses the energy from a previous stage. The steam that is produced condenses into pure liquid water, and the remaining salt solidifies and can be removed.

Even in view of the above solar distillation approaches there is still a need to improve upon such a system for processing seawater or other contaminated water that is not portable to provide fresh water.

SUMMARY

A solar distillation system includes at least one solar panel configured to reflect sunlight, and a distillation tube adjacent the at least one solar panel that is configured to receive a liquid to be processed into fresh water. The liquid flows through the distillation tube and is heated by the reflected sunlight. At least one supplemental distillation unit is connected to the distillation tube and has at least one curved surface to receive the reflected sunlight. The least one supplemental distillation unit includes a plurality of sprayers configured to spray the liquid onto the at least one curved surface to be further processed into fresh water.

The liquid may comprise at least one of brine, sea water, oil field frack water or industrial waste water.

The at least one supplemental distillation unit may be configured as a first supplemental distillation unit connected to a first end of the distillation tube, with the at least one curved surface being perpendicular to the distillation tube to receive the reflected sunlight.

The at least one supplemental distillation unit may be configured as a second supplemental distillation unit connected to a second end of the distillation tube, with the at least one curved surface being perpendicular to the distillation tube to receive the reflected sunlight.

The solar distillation system may further comprise a fresh water tank, and a vacuum pump coupled to the fresh water tank. The first supplemental distillation unit may further comprise a first vacuum port coupled to the fresh water tank, the first vacuum port is to receive water vapor that is generated as the liquid is heated in response to being sprayed onto the at least one curved surface. The second supplemental distillation unit may further comprise a second vacuum port coupled to the fresh water tank, the second vacuum port is to receive water vapor that is generated as the liquid is heated in response to being sprayed onto the at least one curved surface.

The distillation tube may comprise a vacuum line having first and second ends extending between the first and second ends of the distillation tube. The first supplemental distillation unit may further comprise a first vacuum line coupled to the first vacuum port and to the first end of the vacuum line. The second supplemental distillation unit may further comprise a second vacuum line coupled between the second end of the vacuum line and the second vacuum port.

The at least one of the first and second vacuum ports receives water vapor that is generated within the distillation tube.

The second supplemental distillation unit may further comprise a trough positioned to receive the liquid exiting the second end of the distillation tube, with the trough including a drain for the liquid to exit the trough. A sprayer pump may be coupled between the drain and the plurality of sprayers in the second supplemental distillation unit for causing the liquid to be sprayed onto the at least one curved surface of the second supplemental distillation unit.

As the liquid fills the trough, excess liquid overflows from the trough to a lower portion of the second supplemental distillation unit.

The second supplemental distillation unit may further comprise a drain for the liquid to exit the second supplemental distillation unit, and a recirculation line within the second supplemental distillation unit and extending through the distillation tube and coupled to the plurality of sprayers in the first supplemental distillation unit. A recirculation pump may be coupled between the drain and the recirculation line for causing the liquid to be sprayed onto the at least one curved surface of the first supplemental distillation unit.

The distillation tube may extend in a longitudinal direction, and wherein the at least one supplemental distillation unit is configured as a third supplemental distillation unit positioned inline with the distillation tube and extending in the longitudinal direction. The at least one supplemental distillation unit may have a pair of spaced apart curved surfaces to receive the reflected sunlight, and a plurality of sprayers configured to spray brine onto the pair of spaced apart curved surfaces of the third supplemental distillation unit to be further processed into fresh water.

The distillation tube may comprise a vacuum line extending between first and second ends of the distillation tube, and wherein the third supplemental distillation unit may further comprise a third vacuum port coupled to a vacuum line to receive water vapor that is generated as the liquid is heated in response to being sprayed onto the pair of spaced apart curved surfaces.

The second supplemental distillation unit may further comprise a drain for the liquid to exit the second supplemental distillation unit, and a recirculation line within the second supplemental distillation unit and extending through the distillation tube and coupled to the plurality of sprayers in the third supplemental distillation unit. A recirculation pump may be coupled between the drain and the recirculation line for causing the liquid to be sprayed onto the pair of spaced apart curved surfaces in the third supplemental distillation unit.

The third supplemental distillation unit may further comprise a drain for the liquid to exit the third supplemental distillation unit, and a recirculation line within the third supplemental distillation unit and extending through the distillation tube and coupled to the plurality of sprayers in the first supplemental distillation unit. A recirculation pump may be coupled between the drain and the recirculation line for causing the liquid to be sprayed onto the onto the at least one curved surface in the first supplemental distillation unit.

Another aspect is directed to a method for processing a liquid to fresh water using the solar distillation system as described above. The method includes reflecting sunlight onto a distillation tube that is to receive liquid to be processed into fresh water, with the liquid flowing through the distillation tube and being heated by the reflected sunlight. The method further includes reflecting sunlight onto at least one supplemental distillation unit connected to the distillation tube and having at least one curved surface to receive the reflected sunlight. The at least one supplemental distillation unit includes a plurality of sprayers configured to spray the liquid onto the at least one curved surface to be further processed into fresh water.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
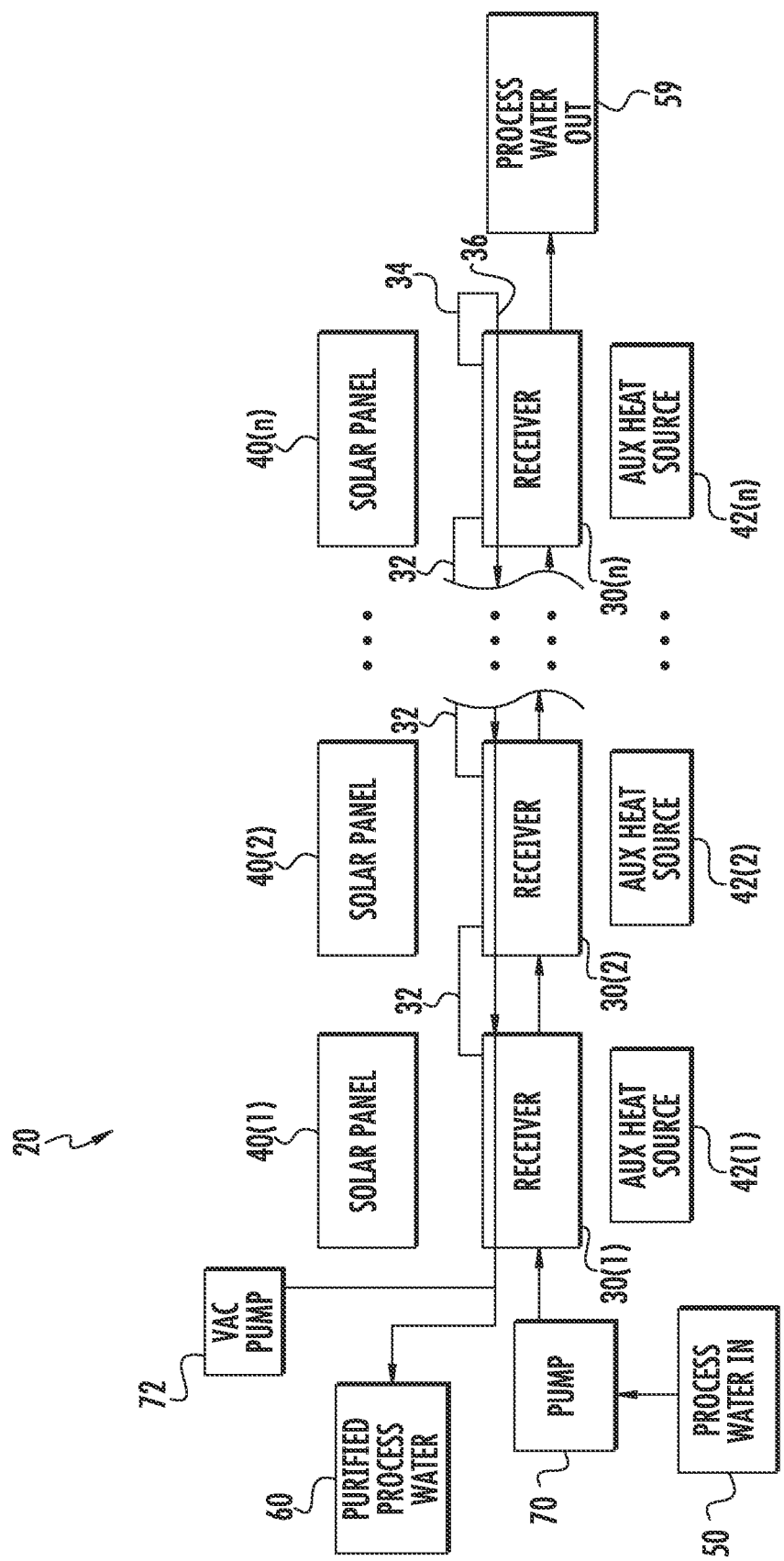
FIG. 1 is a block diagram of a multi-effect solar distillation system in which various aspects of the disclosure may be implemented.

Referring initially to FIG. 1, a multi-effect solar distillation system 20 includes a plurality of receivers 30(1)-30(n) and a plurality of solar panels 40(1)-40(n) adjacent the plurality of receivers. Each receiver is positioned within a focal point of a respective solar panel.

The water to be processed will be generally referred to as process water 50. The process water 50 may be sea water, oil field frack water or industrial waste water, for example. The process water 50 is heated as it flows through each of the receivers 30(1)-30(n). As the process water 50 is heated, water vapor is generated, which will eventually provide purified process water 60.

The process water 50 is heated in stages, with each receiver corresponding to a stage. A multi-stage or multi-effect approach to heating the process water 50 is efficient since each stage essentially reuses the energy from a previous stage. As the process water 50 is heated within each receiver, water vapor is generated.

In the illustrated embodiment, a small percentage of the process water 50 is turned to vapor as it travels through the receivers 30(1)-30(n). This percentage may be within a range of about 10-20%, for example. The last receiver 30(n) directs the remaining process water 54 to the sea if it is sea water, or to a holding tank for further processing if it is oil field frack water or industrial waste water.

Water vapor flows between adjacent receivers 30(1), 30(2) via a vapor tube 32 connected therebetween. At the last receiver 30(n), a return vapor tube 34 is connected to a distillation tube 36. The return vapor tube 34 directs the vapor to an input of the distillation tube 36. The distillation tube 36 extends through each of the receivers 30(1)-30(n) but is separate from the process water 52 circulating within each receiver.

As the water vapor travels through the distillation tube 36, it changes phases back to a liquid. The heat given off during this phase change is provided to each respective stage, thus further increasing the efficiency of the illustrated multi-effect solar distillation system 20. An output of the distillation tube 36 provides the purified process water 60.

Since the process water 50 flows through the receivers 30(1)-30(n) instead of a heat transfer fluid (HTF), the illustrated multi-effect solar distillation system 20 is also referred to as an "in-situ" multi-effect solar distillation system.

Figure 2:
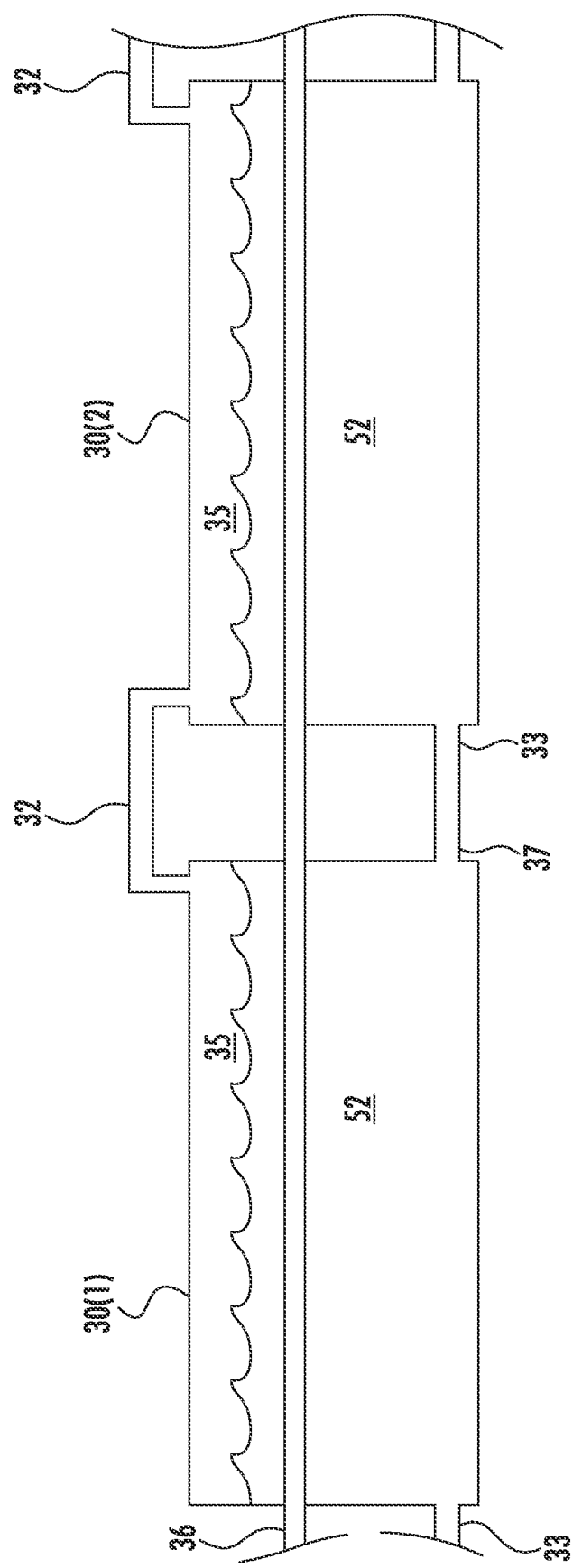
FIG. 2 is a detailed view of the first and second receivers illustrated in FIG. 1.

The process water 50 enters an input 33 of the first receiver 30(1) and fills the first receiver 30(1) except for an air gap 35 at the top so as to allow water vapor to develop, as illustrated in FIG. 2. The air gaps 35 may be about 10-20% of the volume of the receivers. The distillation tube 36 is positioned so that it is below the air gap 35. As noted above, positioning the distillation tube 36 in contact with the process water 50 advantageously allows heat to be given off as the water vapor changes phases back to a liquid.

An output 37 of the first receiver 30(1) is connected to an input 33 of the second receiver 30(2). The process water 52 fills the second receiver 30(2) except for another air gap 35 at the top so as to allow water vapor to develop. This process continues for each of the receivers.

Figure 3:
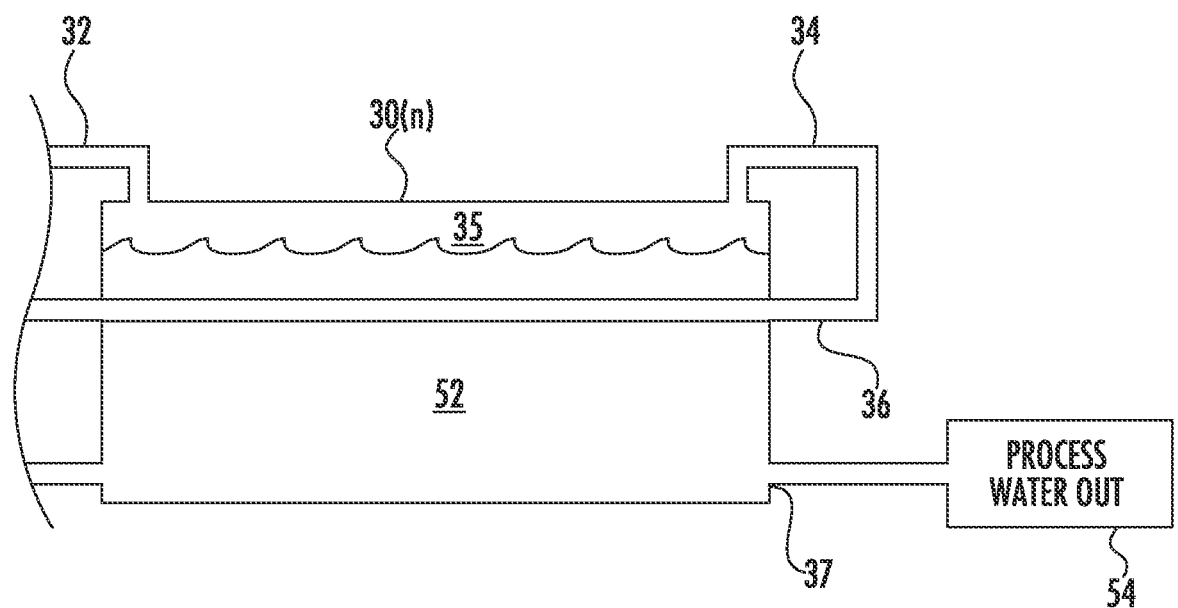
FIG. 3 is a detailed view of the last receiver illustrated in FIG. 1.

A vapor tube 32 couples together the air gaps 35 in any two adjacent receivers. In the illustrated example, a vapor tube 32 provides a passageway for the water vapor to travel from the air gap 35 in the first receiver 30(1) to the air gap 35 in the second receiver 30(2). This process continues for each of the receivers. At the last receiver 30(n), a return vapor tube 34 couples the air gap 35 therein to the distillation tube 36, as illustrated in FIG. 3.

As will now be discussed in greater detail, the multi-effect solar distillation system 20 includes multiple components for heating the process water 50 to the desired temperature. These components include a structure to preheat the process water, a parabolic trough for the capture of solar thermal energy, a circulation pump, a receiver with a large solar impingement area and a low interior volume, and a distillation tube.

To further improve heating of the process water 50, the multi-effect solar distillation system 20 may include a vacuum pump or system 72 coupled to the distillation tube to help lower the boiling temperature of the process water 50 as well as provide direction to the flow of the water vapor. In addition, a plurality of auxiliary heat sources 42(1)-42(n) may be positioned adjacent the plurality of receivers 30(1)-30(n) to allow for low or no sun operation. The auxiliary heat sources 42(1)-42(n) may be gas burners, for example.

Preheat can be accomplished by storing the process water 50 in a lined pond or tank with a large surface exposure area that is covered by a greenhouse style building. The building has sides and a roof made from a clear material that will let the ambient solar energy in and warm the stored process water 50. The roof of the building may be shaped so as to channel any water vapor that will condense into a collector as this will be purified process water. The building may be constructed so that minimal heat and water vapor will be lost to the outside environment so as to increase efficiency.

Figure 4:
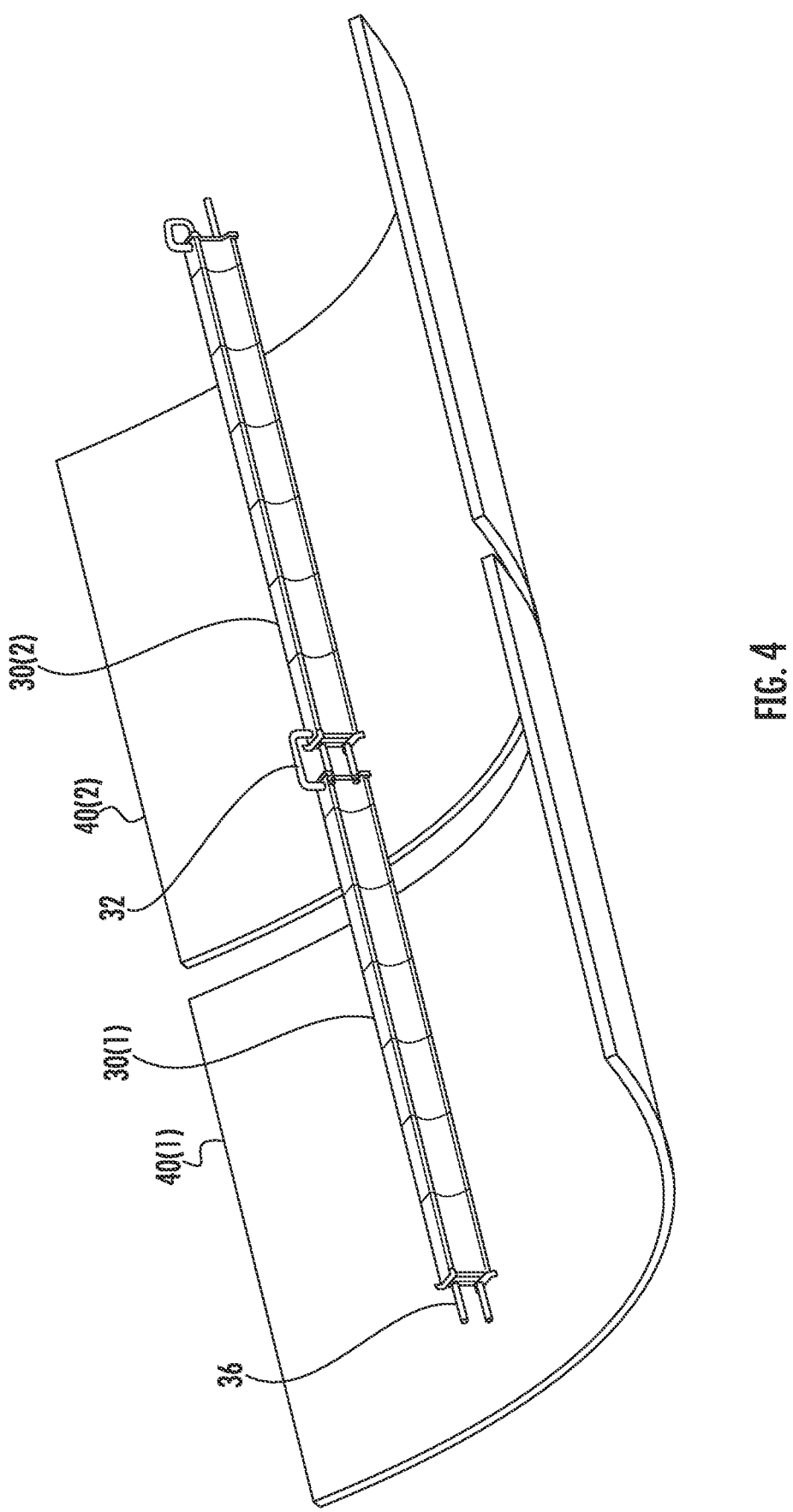
FIG. 4 is a perspective view of one embodiment of the receivers and solar panels illustrated in FIG. 1.

The solar panels 40(1)-40(n) may be configured as large aperture parabolic troughs, as illustrated in FIG. 4. Each parabolic trough includes a reflective material for directing the sunlight to a focal point. The reflective material may be glass mirrors or thin reflective film, for example. The parabolic troughs may be placed in series to allow for the heating of the process water 50 to a proper temperature.

A pump 70 moves the process water through the receivers 30(1)-30(n), as illustrated in FIG. 1. The pump 70 includes controls to vary the flow rate of the process water 50. Control of the flow rate controls a rate of evaporation of the process water 50. The flow rate of the process water 50 through the receivers 30(1)-30(n) may be within a range of about 5-15 gallons per minutes, for example. As readily appreciated by those skilled in the art, the flow rate is selected so that a desired percentage of the process water vaporizes as it travels through the receivers 30(1)-30(n). As the flow rate is increased, then the number of receiver stages would also need to be increased to obtain the desired temperate to vaporize the process water 50. The flow rate is inversely proportional to the energy absorbed by the receivers 30(1)-30(n).

The receivers 30(1)-30(n) are configured to provide a large solar impingement area, yet have a low interior volume. The receivers 30(1)-30(n) are located within the parabolic trough 40(1)-40(n) so that the solar energy is reflected thereon from both upper and lower halves of the parabolic trough. The receivers 30(1)-30(n) are mounted so that they may be adjusted to aid in an optimum position to receive the solar energy.

Figure 5:
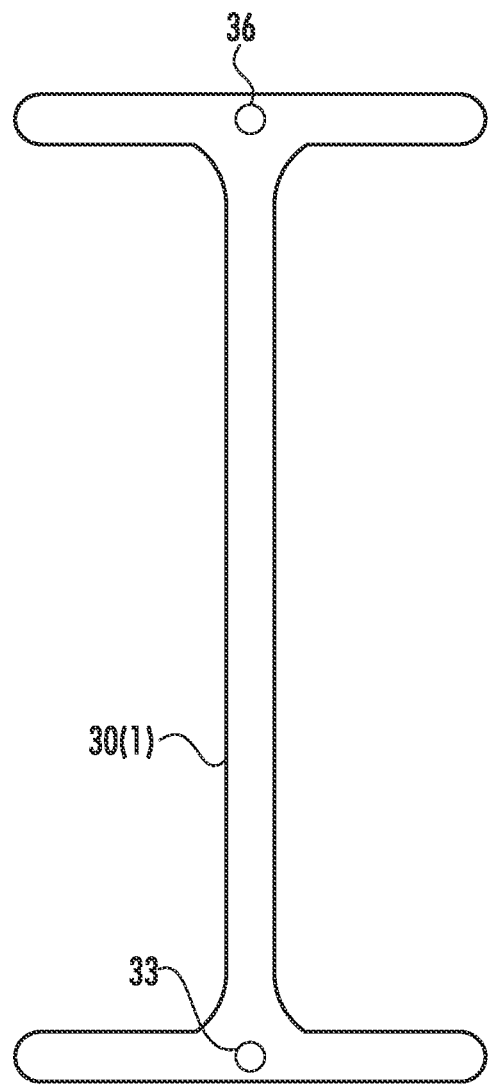
FIG. 5 is a side view of one embodiment of the receiver illustrated in FIG. 1 having an I-shape.

A fill port or input 33 and an exit port of output 37 at a bottom of each receiver allows for the process water 50 to enter and exit. The receiver is not limited to any particular design. One example design of a receiver 30(1) is an I-shape, as illustrated in FIG. 5. The I-shaped receiver 30(1) is sized according to the corresponding parabolic trough 40(1). Example dimensions are 6 inch top and bottom sections centered perpendicular to a 12 inch vertical section. This structure is hollow on the inside to allow for the process water to be directed down the length of the receiver.

Several inches down from the top of the vertical sides would flare away from each other to increase the overall width to allow for the placement of the distillation or condensate tube 36. The I-shaped receiver 30(1) is sealed to collect the water vapor being created by the heating of the process water. The water level is controlled so that there will be a gap or void 35 at the top of the I-shaped receiver 30(1) to allow for the collection of the water vapor. An opening at the top of the receiver 30(1) directs the clean water vapor to a vapor tube 32 coupled to an adjacent receiver. The 6 inch wide top and bottom section of the receiver 30(1) provides an additional area to capture solar energy. All dimensions are approximate and may be changed to ensure optimum solar impingement along the receiver 30(1).

Figure 6:
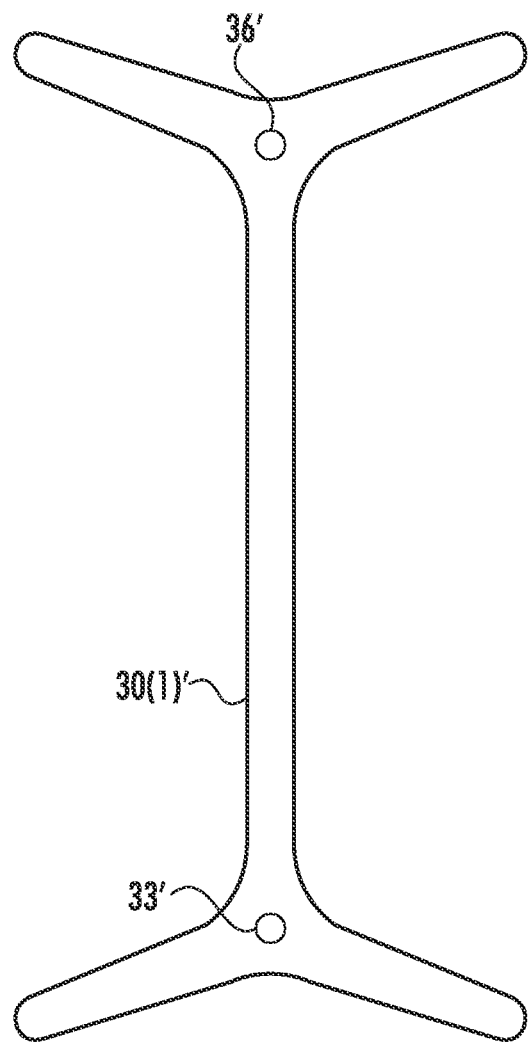
FIG. 6 is a side view of another embodiment of the receiver illustrated in FIG. 1 having a Y-shape.
Figure 7:
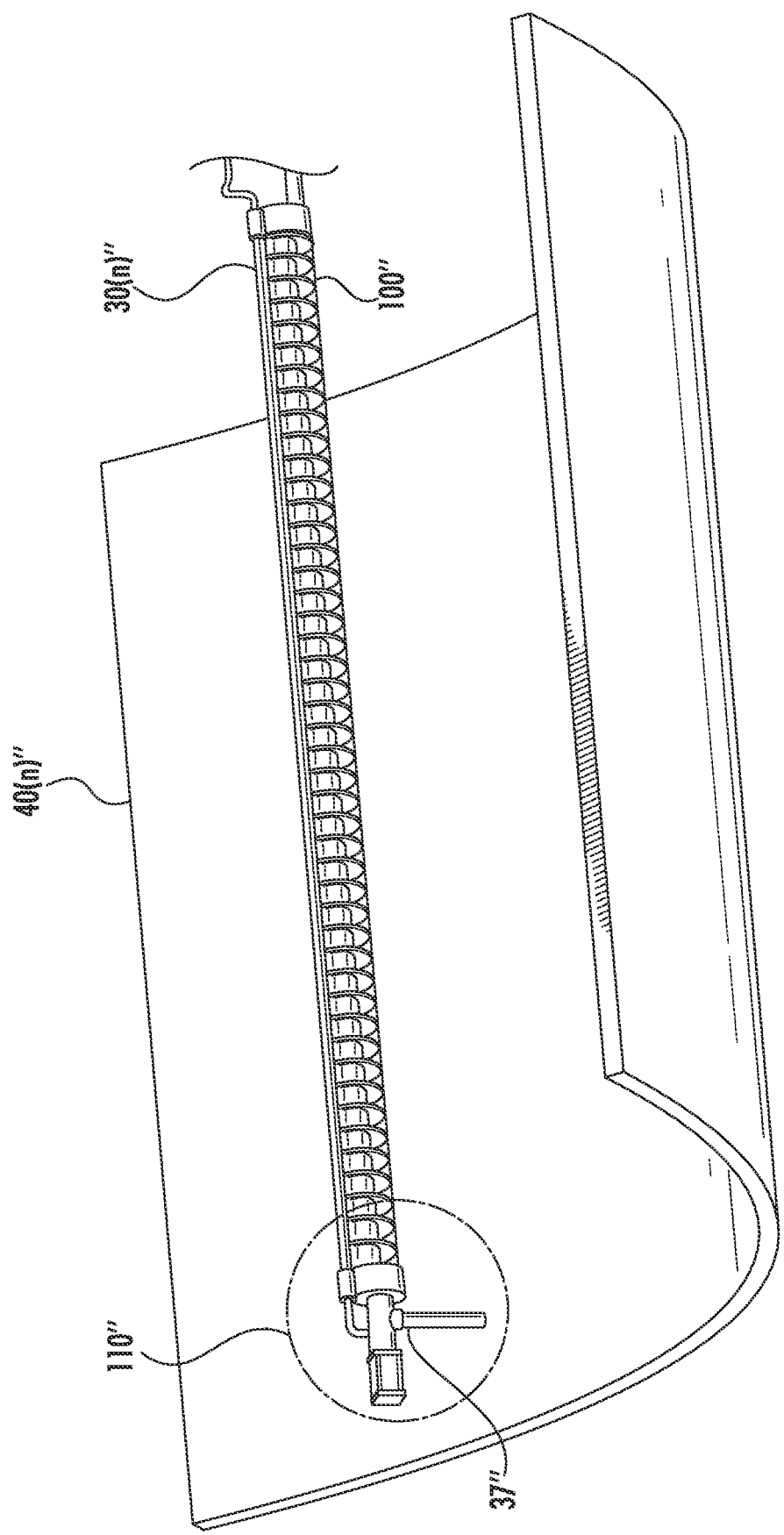
FIG. 7 is an exposed perspective view of another embodiment of the last receiver illustrated in FIG. 1 with an auger included therein.
Figure 8:
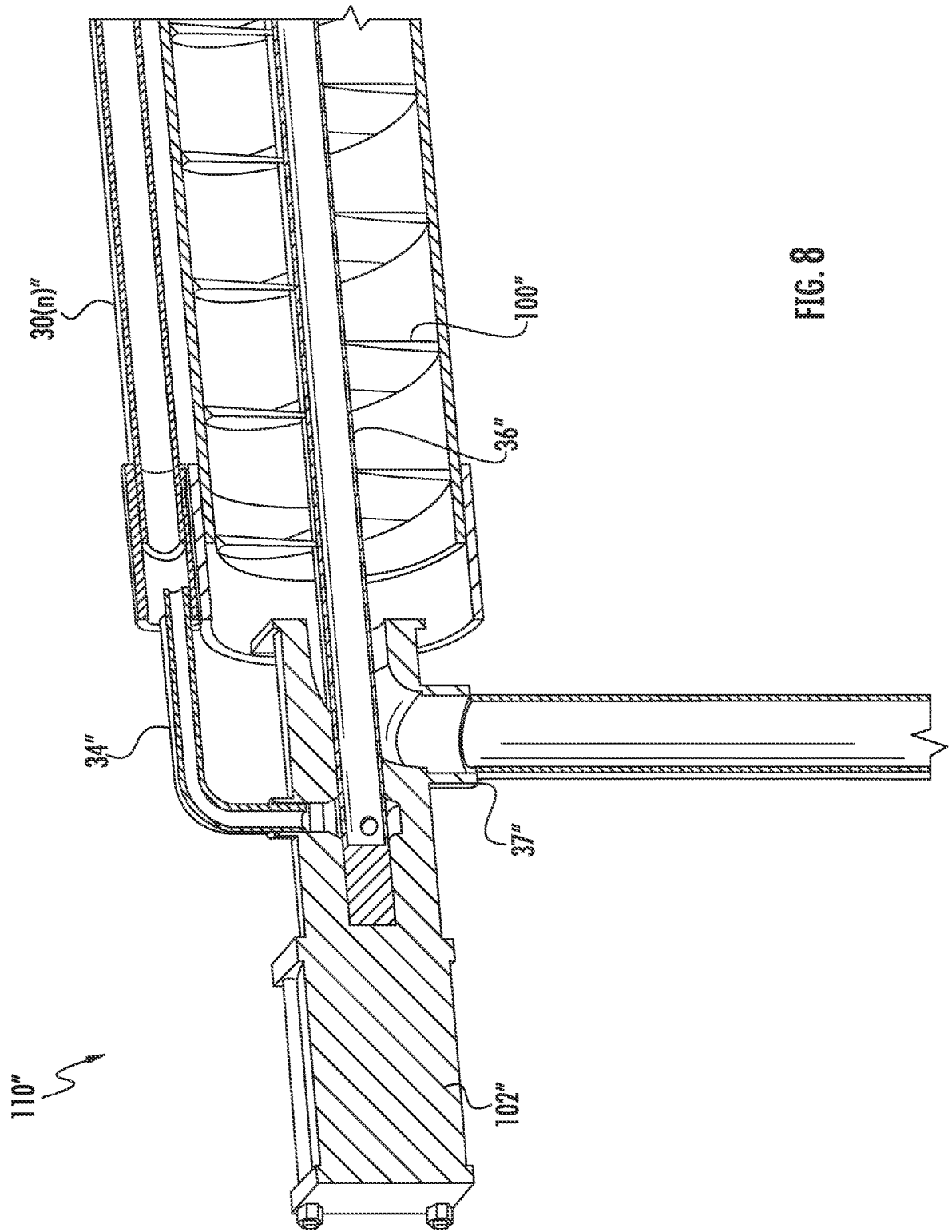
FIG. 8 is an enlarged cross-sectional view of section 110" highlighted in FIG. 7.
Figure 9:
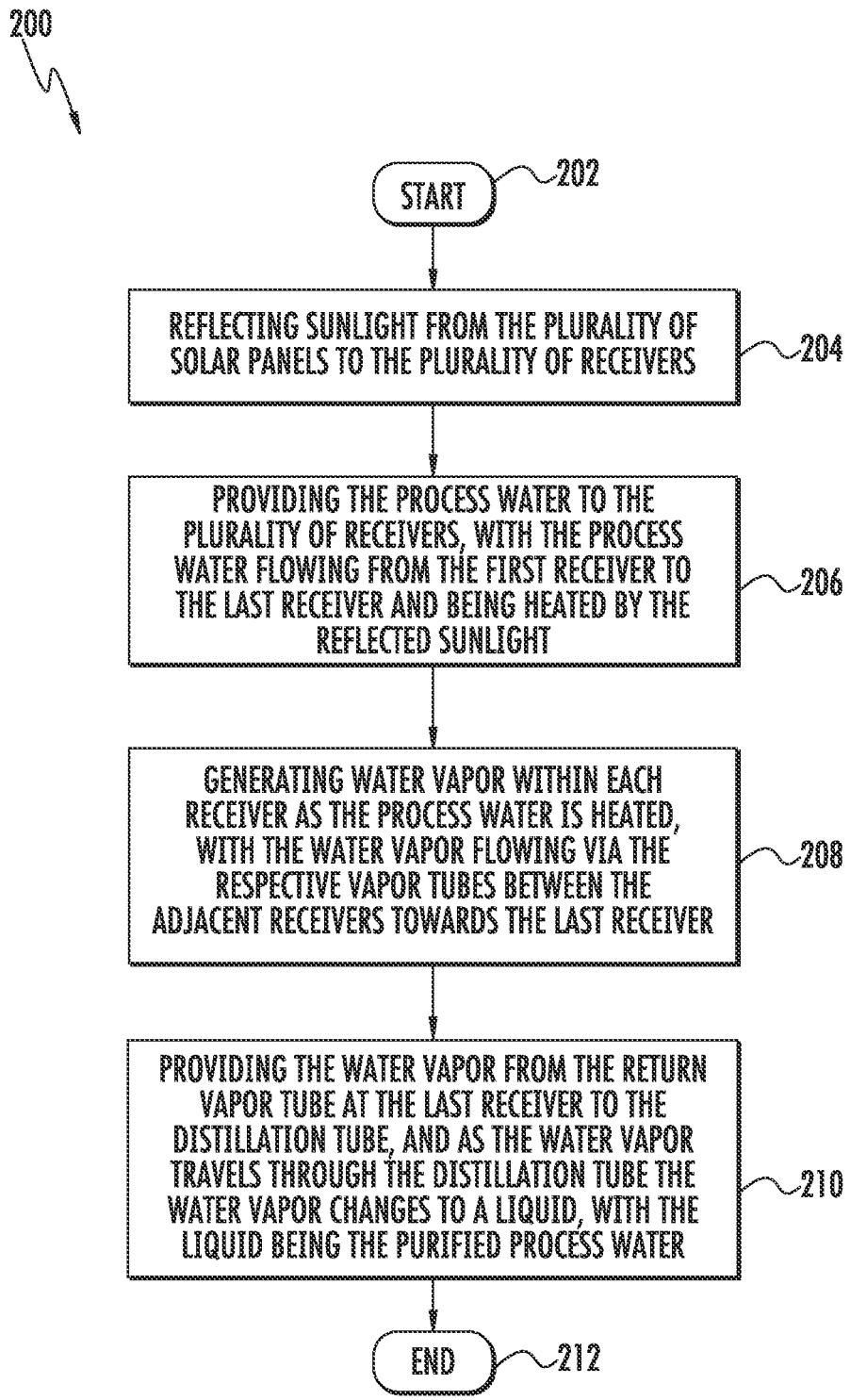
FIG. 9 is a flowchart illustrating a method for processing process water to purified process water using a solar distillation system as illustrated in FIG. 1.

Another example design of a receiver is a double Y-shaped receiver 30(1)', as illustrated in FIG. 6. The dimensions will be approximately 5.6×13 inches. This hollow double Y-shaped receiver 30(1)' features a thin vertical chamber section with a Y-shaped section attached at both the top and bottom of the vertical section. Like the I-shaped receiver, the double Y-shaped receiver 30(1)' is sealed to capture the water vapor upon heating and likewise features a condensate tube 36' placed inside. An opening at the top of the receiver 30(1)' directs the clean water vapor to a vapor tube coupled to an adjacent receiver.

As noted above, the distillation tube 36 extends through each of the receivers 30(1)-30(n) but is separate from the process water 52 circulating within each receiver. The distillation tube 36 thus provides the outlet for the water vapor to escape the distillation chamber of the receiver. This tube could be directed to a heat exchanger where the incoming process water will pass over the tube to cool the vapor so that water is formed and then collected into a purified water storage tank or pond. The distilled vapor in the condensate tube never intermingles with the process water.

The condensate tube runs "counter current" to the flow within the receiver. The condensate tube is formed within the receiver so that the flow of the steam is in an opposite direction to the process water. This allows the water vapor to release its heat into the flow of the process water to advantageously increase the efficiency of the cycle as the heat contained in the water vapor is returned into the cycle.

As noted above, the vacuum pump or system 72 may be used to lower the temperature at which water turns from a liquid into a vapor. A vacuum may also be applied to the port where the water vapor exits the receiver. The vacuum can be applied separately to each receiver or daisy chained in series. At the end of the vacuum line and before entering the vacuum pump 72, the condensate will enter a separator to remove the distilled water from the air column.

As also noted above, a plurality of auxiliary heat sources 42(1)-42(n) may be positioned underneath the plurality of receivers 30(1)-30(n) to allow for low or no sun operation. The auxiliary heat sources 42(1)-42(n) may be gas burners, for example, and when ignited, provides a heat source on the receivers 30(1)-30(n) for the distillation process when solar conditions are not sufficient for the process to occur.

The pump 70 moves the process water throughout the receivers 30(1)-30(n). The pump 70 includes controls to vary the flow rate of the process water 50. The flow of the process water may be slowed so that a much larger percentage of the process water is vaporized. As a result, salt or containments remaining from the evaporated process water accumulates to form a sludge in the last receiver 30(n)". To force the sludge out of the last receiver 30(n)", an auger 100" is included therein. The auger 100" forces the accumulated sludge out an exit port. The condensate tube 36" runs through the center of the auger 100". A motor 102" coupled to the last receiver 30(n)" drives the auger 100".

To further increase the efficiency of collecting and directing solar energy to the receivers 30(1)-30(n), each solar panel 40(1) may comprise a plurality of tunable solar collector panels carried by a base. Each solar collector panel may be tuned or biased in terms of position so that the sun's radiation as reflected from each solar collector panel is more accurately aligned on the focal line where the receiver 30(1) is positioned so as to maximize the amount of energy received.

Collectively the solar collector panels may have a parabolic shape, and are separate from one another. Coupled to the solar collector panels are panel positioning devices. The panel positioning devices move the solar collector panels based on optical sensor devices that are used to determine alignment of the respective focal lines where the receivers are positioned so as to maximize the amount of energy received.

Yet another feature of the above-described receivers 30(1)-30(n) is to position the metal receivers within within glass tube sections. The glass tube sections prevent heat from the metal receivers from escaping. Each glass tube section interfaces with an adjacent glass tube section via an expansion baffle. Metal seals at the ends of the glass tube sections are coupled to the expansion baffle. The expansion baffle allows for expansion and contraction of the metal seals so as to avoid breakage to the glass tube sections. A vacuum may also be pulled through the glass tube sections.

Even though process water 50 is flowing through the receivers 30(1)-30(n), a heat transfer fluid (HTF) may be flowed instead. The heated HTF would then power a heat pump. The heat may then be fed to a multi-effect or multi-stage distillation system that evaporates the freshwater from the seawater or contaminated water.

As an alternative to the condensate tube running "counter current" to the flow within the receivers, the condensate tube may run "co-current" to the flow within the receivers. The purified process water would exit the last receiver along with the process water out.

Another aspect is directed to a method for processing process water 50 to purified process water 60 using the solar distillation system 20. From the start (Block 202), the method comprises reflecting sunlight from the plurality of solar panels 40(1)-40(n) to the plurality of receivers 30(1)-30(n) at Block 204. The process water 50 is provided to the plurality of receivers 30(1)-30(n) at Block 206, with the process water flowing from the first receiver 30(1) to the last receiver 30(n) and being heated by the reflected sunlight. Water vapor is generated at Block 208 within each receiver as the process water 50 is heated. The water vapor flows via the respective vapor tubes 32 between the adjacent receivers towards the last receiver 30(n). The water vapor is provided from the return vapor tube 34 at the last receiver 30(n) to the distillation tube 36 at Block 210. As the water vapor travels through the distillation tube 36 the water vapor changes to a liquid, with the liquid being the purified process water 60. The method ends at Block 212.

Figure 10:
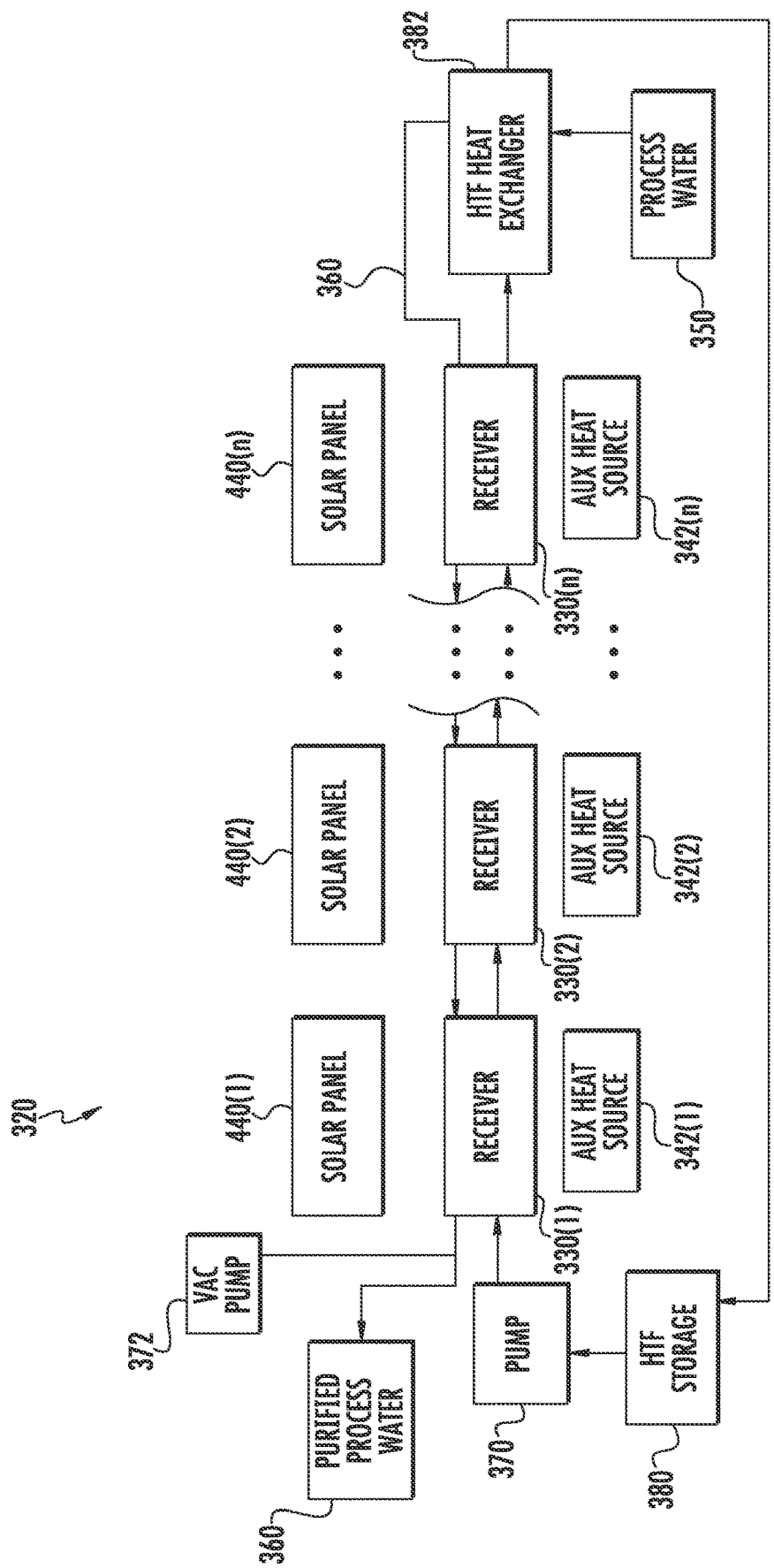
FIG. 10 is a block diagram of another embodiment of a multi-effect solar distillation system in accordance with the present disclosure.

Another embodiment of a multi-effect solar distillation system 300 using a heat transfer fluid (HTF) will now be discussed in reference to FIG. 10. The illustrated multi-effect solar distillation system 320 includes a plurality of receivers 330(1)-330(n) and a plurality of solar panels 440(1)-440(n) adjacent the plurality of receivers. Each receiver is positioned within a focal point of a respective solar panel. Instead of heating the process water within the receivers 330(1)-330(n) as with the above embodiment, a heat transfer fluid (HTF) is heated. The HTF may be mineral oil or glycol, for example.

An HTF storage 380 provides the HTF that flows through the receivers 330(1)-330(n) to be heated. A pump 370 moves the HTF through the receivers 30(1)-30(n), and includes controls to vary the flow rate of the HTF.

The HTF is heated as it flows through each of the receivers 330(1)-330(n). As with the process water 50 above, the HTF is heated in stages, with each receiver corresponding to a stage. A multi-stage or multi-effect approach to heating the HTF is efficient since each stage essentially reuses the energy from a previous stage.

At the last receiver **330(*n*), the heated HTF is provided to a heat exchanger 382. The process water 350 is also provided to the heat exchanger 382 for conversion to steam. The heat exchanger 382 may be a flash heat exchanger, for example, where the heated HTF is routed through a grid. The process water 350 is then splashed or sprayed onto the grid, which then turns to water vapor and/or steam. This type of heat exchanger 382 is also known as a flash exchanger, as readily appreciated by those skilled in the art. The process water 350** does not come in contact with the HTF.

The steam generated by the HTF heat exchanger 382 is directed to the distillation tube 336. The distillation tube 336 extends through each of the receivers **330(1)-330(*n*) but is separate from the HTF circulating within each receiver. The HTF provided at the output of the heat exchanger 382 is recirculated back to the HTF storage 380**.

As the steam travels through the distillation tube 336, it changes phases back to a liquid. The heat given off during this phase change is provided to each respective stage, thus further increasing the efficiency of the illustrated multi-effect solar distillation system 320. An output of the distillation tube 336 provides the purified process water 360.

The distillation tube 336 is in contact with the HTF circulating within each receiver. The HTF advantageously allows heat to be given off as the water vapor changes phases back to a liquid. help lower the boiling temperature of the HTF as well as]

The multi-effect solar distillation system 320 may include a vacuum pump or system 372 coupled to the distillation tube 336 to provide direction to the flow of the water vapor. In addition, a plurality of auxiliary heat sources **342(1)-342(*n*) may be positioned adjacent the plurality of receivers 330(1)-330(*n*) to allow for low or no sun operation. The auxiliary heat sources 342(1)-342(*n*)** may be gas burners, for example.

The distillation (i.e., condensation) tube 336 runs "counter current" to the flow within the receiver. The condensate tube is formed within the receiver so that the flow of the steam is in an opposite direction to the HTF. This allows the water vapor to release its heat into the flow of the HTF to advantageously increase the efficiency of the cycle as the heat contained in the water vapor is returned into the cycle.

The auxiliary heat sources **342(1)-342(*n*) may be gas burners, for example, and when ignited, provides a heat source on the receivers 330(1)-330(*n*)** for the distillation process when solar conditions are not sufficient for the process to occur.

Figure 11:
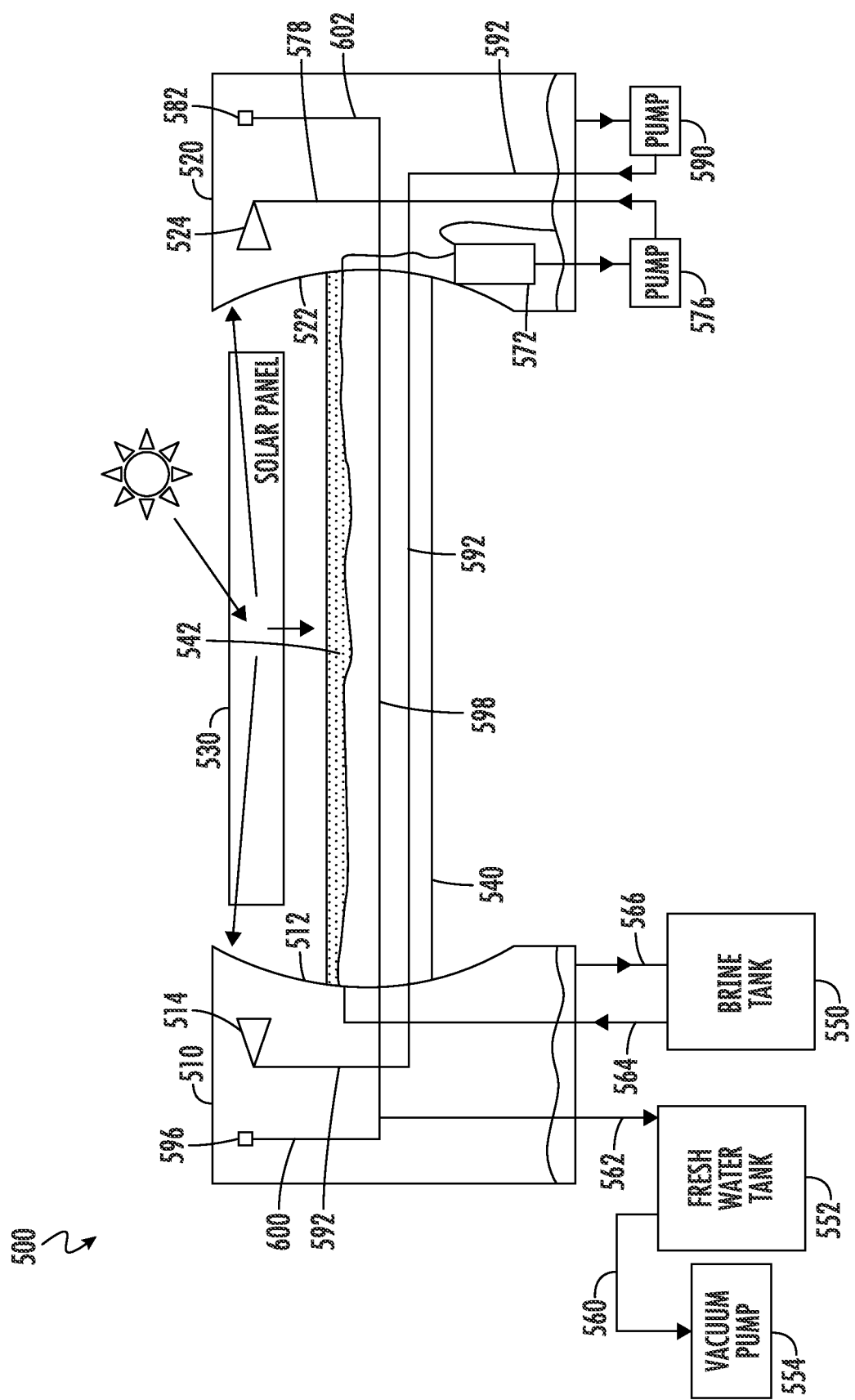
FIG. 11 is a block diagram of a solar distillation system with first and second supplemental distillation units in which various aspects of the disclosure may be implemented.
Figure 12:
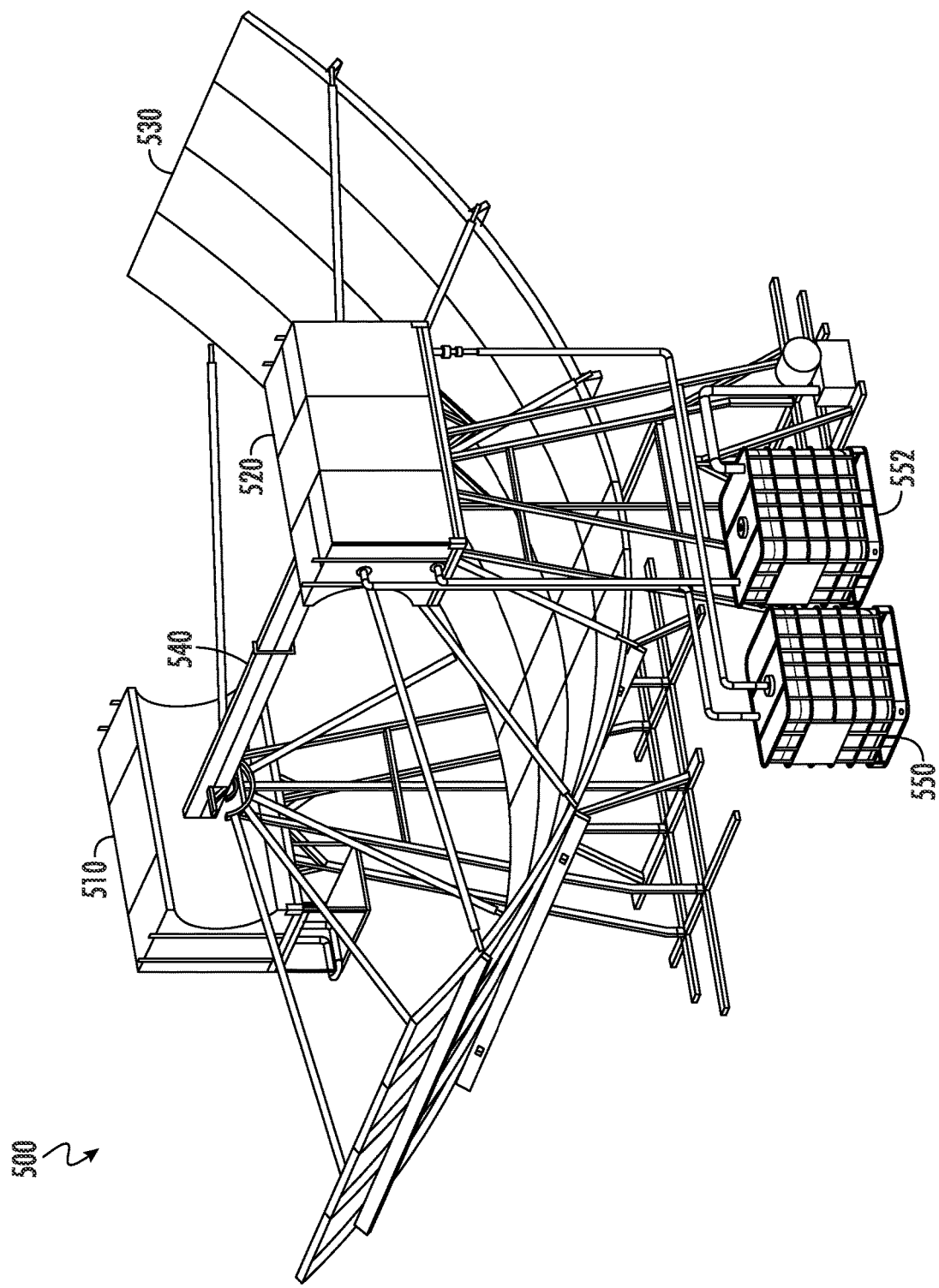
FIG. 12 is a perspective view of the solar distillation system illustrated in FIG. 11.
Figure 13:
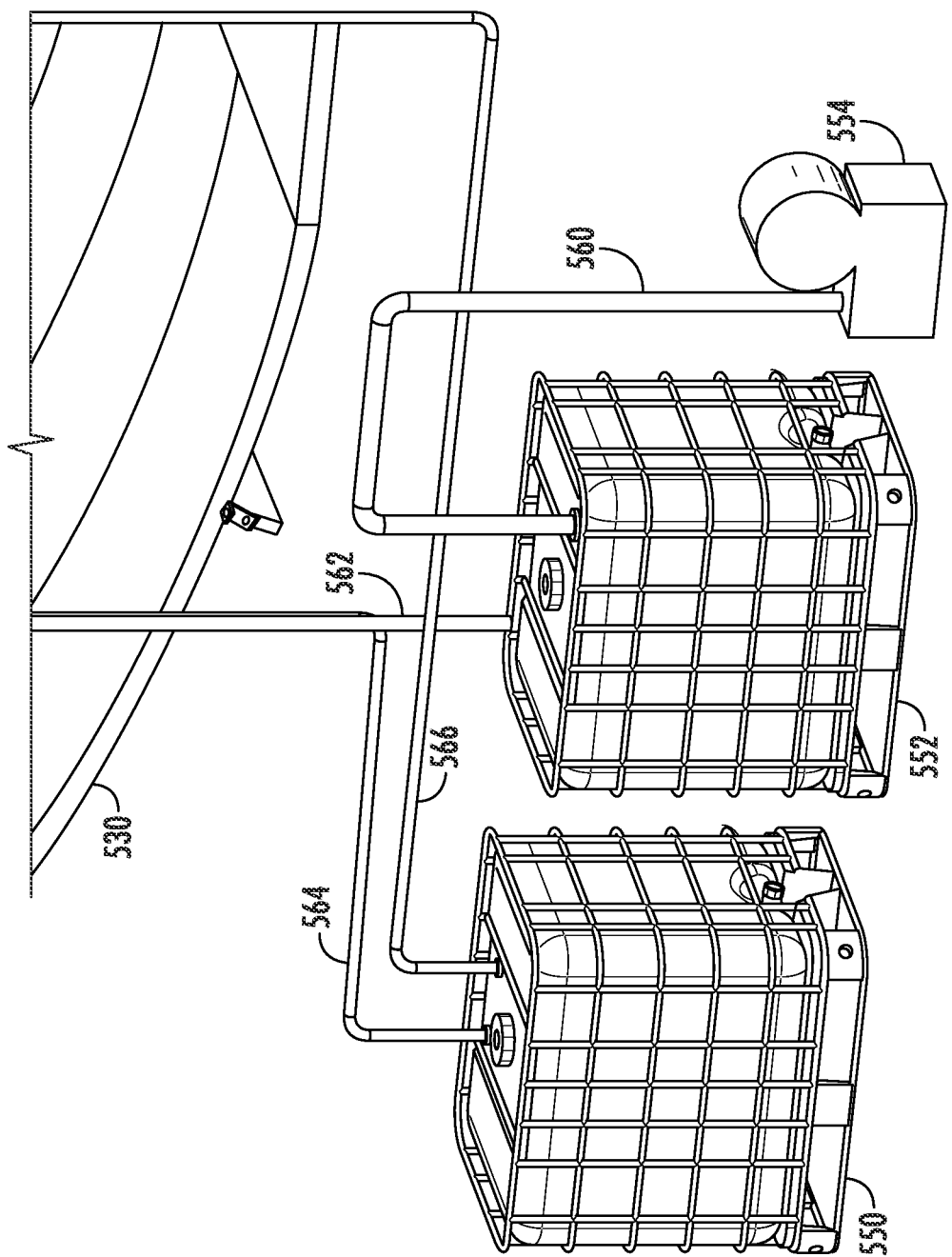
FIG. 13 is a perspective view of the brine and fresh water tanks illustrated in FIG. 12.

Referring now to FIGS. 11-13, another aspect of a solar distillation system will be discussed. The illustrated solar distillation system 500 includes supplemental distillation units 510, 520. Supplemental distillation unit 510 will be referred to as the first supplemental distillation unit, and supplemental distillation unit 520 will be referred to as the second supplemental distillation unit.

Even though the solar distillation system 500 is not illustrated as a multi-effect solar distillation system, the first and second supplemental distillation units 510, 520 may also be used in the multi-effect solar distillation system 20 as discussed above.

The first and second supplemental distillation units 510, 520 increase the efficiency of processing brine into fresh water by recapturing sunlight reflected from the solar panel 530 that is not received by the distillation tube 540. The addition of the first and second supplemental distillation units 510, 520 increase the efficiency within a range of about 50-80% as compared to the same illustrated solar distillation system without the first and second supplemental distillation units 510, 520.

The reflected sunlight not hitting the distillation tube 540 occurs when the incident angle of the sunlight is not perpendicular to the solar panel 520, which varies throughout the year based on the seasonal adjustment. This is also referred to as the cosine effect which is one of the main reasons that causes energy loss in solar energy concentration systems. The first and second supplemental distillation units 510, 520 compensate for this energy loss by recapturing sunlight reflected from the solar panel 530 that is not received by the distillation tube 540.

The solar distillation system 500 includes at least one solar panel 530 configured to reflect sunlight. Even though a single solar panel is illustrated, a plurality of smaller sized solar panels placed side by side may be used. The distillation tube 540 is adjacent the at least one solar panel 530 and is configured to receive brine to be processed into fresh water, with the brine flowing through the distillation tube 540 and being heated by the reflected sunlight. The solar distillation system 500 is not limited to brine, as sea water, oil field frack water or industrial waste water may also be distilled. As the brine is heated, water vapor is generated, which will provide fresh water. The first supplemental distillation unit 510 is connected to a first end of the distillation tube 540 and has a curved surface 512 perpendicular to the distillation tube 540 to receive the reflected sunlight. The second supplemental distillation unit 520 is connected to a second end of the distillation tube 540 and has a curved surface 522 perpendicular to the distillation tube 540 to receive the reflected sunlight.

As will be discussed in detail below, the first and second supplemental distillation units 510, 520 include a plurality of sprayers 514, 524 configured to spray brine onto the respective curved surfaces 512, 522 to be further processed into fresh water. The sprayers 514, 524 atomize the brine into droplets which are to be vaporized when received by the respective curved surfaces 512, 522 being heated by the reflected sunlight that is not being received by the distillation tube 540.

The solar distillation system 500 includes a brine tank 550 and a fresh water tank 552. The brine tank 550 is to hold the brine that is to be processed into fresh water. The fresh water tank 552 is to receive the water vapor from the processed brine.

A vacuum pump 554 is coupled to the fresh water tank 552 via vacuum line 560. The vacuum pump 554 creates a vacuum for the water vapor to be collected via vacuum line 562 from the first and second supplemental distillation units 510, 520 and the distillation tube 540. Coupled to the brine tank 550 is a brine output line 564 and a brine return line 566. A pump associated with the brine tank 550 outputs the brine into the brine output line 564.

The brine that is not processed into fresh water is returned to the brine tank 550 to be recirculated again for processing. This is a loop process where the brine circulates from the brine tank 550 to the first supplemental distillation unit 510, through the distillation tube 540 and into the second supplemental distillation unit 520 before being returned back through the distillation tube 540 to the first supplemental distillation units 510, which then returns the brine back to the brine tank 550.

Figure 14:
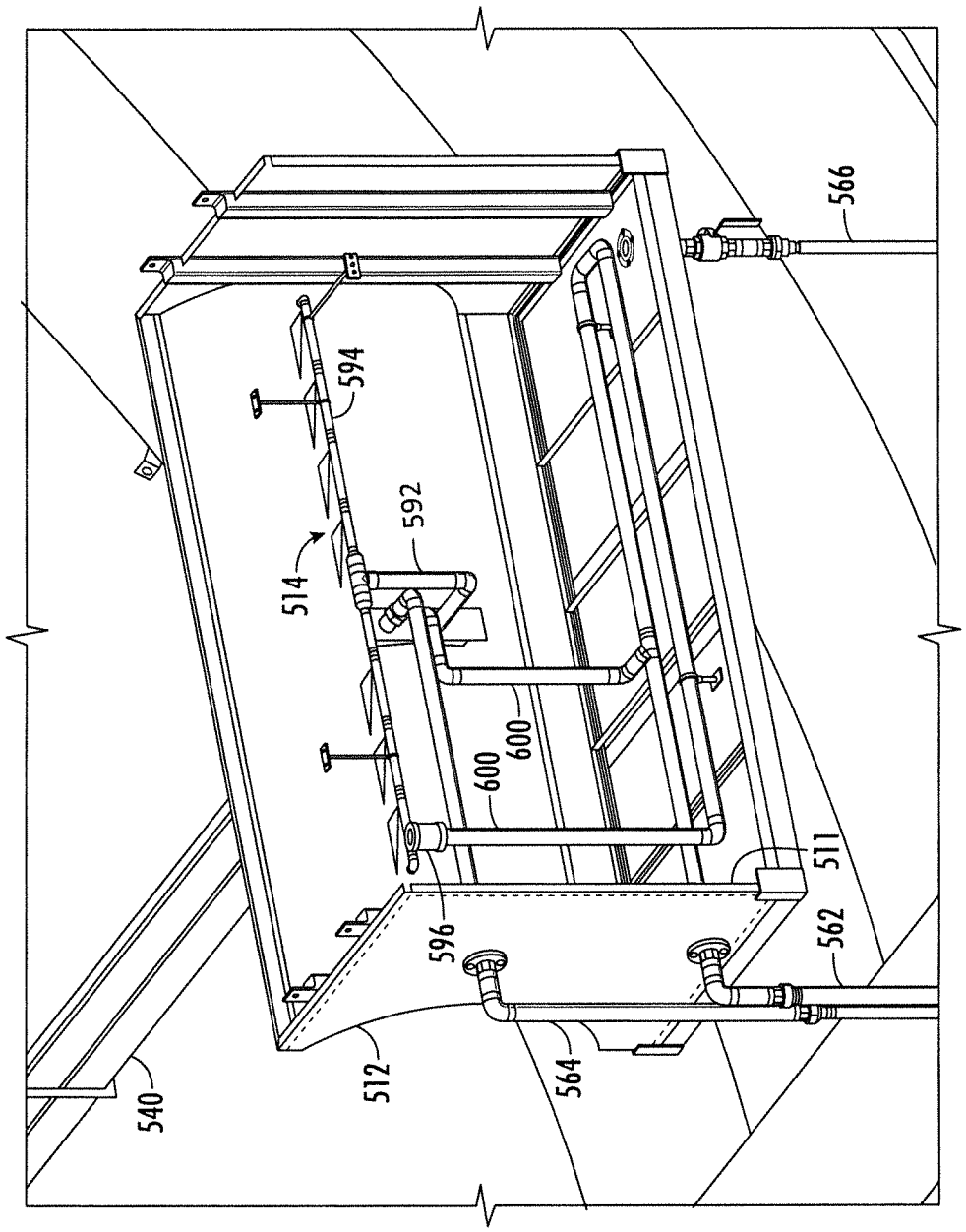
FIG. 14 is a sectional perspective side view of the first supplemental distillation unit illustrated in FIG. 12.
Figure 15:
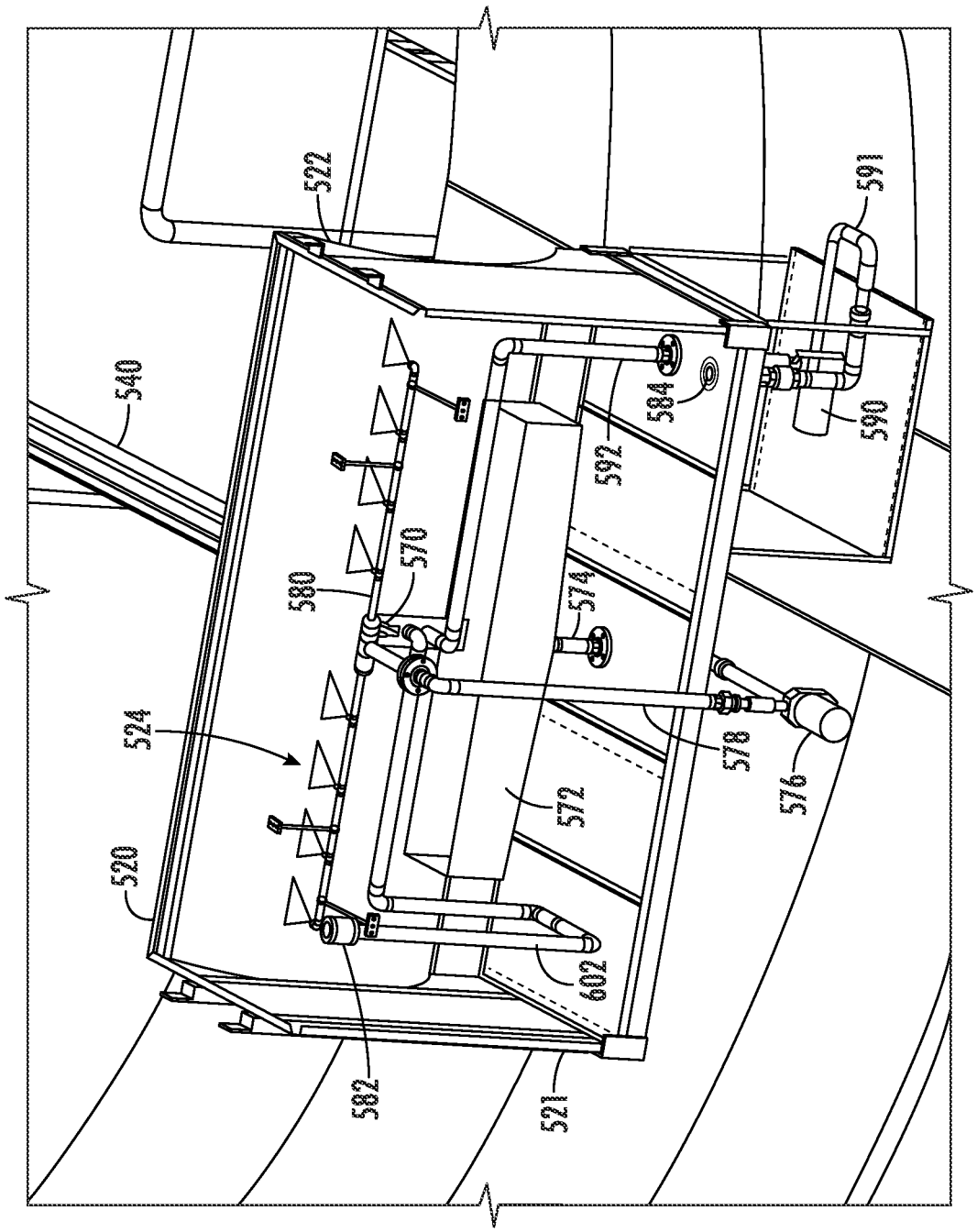
FIG. 15 is a perspective side view of the second supplemental distillation unit illustrated in FIG. 12.

Referring now to FIGS. 14 and 15, the flow of brine through the brine output line 564 back to the brine return line

566 will be discussed. The brine output line 564 extends from the brine tank 550 into the first supplemental distillation unit 510, and is coupled to the first end of the distillation tube 540, as illustrated in FIG. 14.

The brine flows through the distillation tube 540. At the second end of the distillation tube 540, brine exits through an opening 570, as illustrated in FIG. 15. The opening 570 is positioned so that the brine fills the distillation tube 540 except for an air gap 542 at the top to allow water vapor to develop, as illustrated in FIG. 11. The air gap 542 may be about 10-20% of the volume of the distillation tube 540.

The second supplemental distillation unit 520 includes a trough 572 positioned to receive the brine exiting the opening 570 at the second end of the distillation tube 540. The trough 572 includes a drain, and a drain line 574 is coupled to the drain. As the brine fills the trough 572, the brine flows through the drain line 574 to a sprayer pump 576.

An output of the sprayer pump 576 is coupled to a sprayer line 578. The sprayer line 578 is coupled to a plurality of sprayers 524. The sprayers 524 are spaced apart along a sprayer tube 580 which is coupled to the sprayer line 578. Each sprayer 524 sprays a fine mist onto the curved surface 522 of the second supplemental distillation unit 520 receiving the reflected sunlight. As the mist hits the curved surface 522 that is being heated by the sunlight not received by the distillation tube 540, water vapor is generated. The water vapor is collected by a vacuum port 582 within the second supplemental distillation unit 520.

The trough 572 is open so that as the brine fills the trough 572, excess brine overflows to a lower portion of the second supplemental distillation unit 520. The second supplemental distillation unit 520 includes a drain 584 for the brine to exit. The brine is received by a recirculation pump 590 coupled to the drain via drain line 591. The recirculation pump 590 is external a housing 521 of the second supplemental distillation unit 520. An output of the recirculation pump 590 is coupled to a recirculation line 592.

The recirculation line 592 is coupled to the second end of the distillation tube 540, and extends through the distillation tube 540 to the plurality of sprayers 514 in the first supplemental distillation unit 510, as illustrated in FIG. 14. The sprayers 514 are spaced apart along a sprayer tube 594, where each sprayer 514 sprays a fine mist onto the curved surface 512 of the first supplemental distillation unit 510 receiving the reflected sunlight. As the mist hits the curved surface 512 that is being heated by the sunlight not received by the distillation tube 540, water vapor is generated. The water vapor is collected by a vacuum port 596 within the first supplemental distillation unit 510.

The recirculation line 592 may be positioned within the distillation tube 540 so that it is below the air gap 542, as illustrated in FIG. 11. In this configuration, the recirculation line 592 is in contact with the brine. This advantageously allows the already heated brine flowing back to the first supplemental distillation unit 510 to be used to further heat the brine flowing to the second supplemental distillation unit 510. In other configurations, the recirculation line 592 may be above the air gap 542 so that it is not in contact with the brine.

As noted above, the first supplemental distillation unit 510 includes a first vacuum port 596 to receive water vapor that is generated as the brine is heated in response to being sprayed onto the curved surface 512. The second supplemental distillation unit 520 includes a second vacuum port 582 to receive water vapor that is generated as the brine is heated in response to being sprayed onto the curved surface 522.

The distillation tube 540 includes a vacuum line 598 having first and second ends extending between the first and second ends of the distillation tube 540. The vacuum line 598 may be positioned within the distillation tube 540 so that it is below the air gap 542, as illustrated in FIG. 11. In this configuration, the vacuum line 598 is in contact with the brine. This advantageously allows heat to be given off as the water vapor changes phases back to a liquid. In other configurations, the vacuum line 598 may be above the air gap 542 so that it is not in contact with the brine.

The first supplemental distillation unit 510 includes a first vacuum line 600 coupled to the first vacuum port 596 and to the first end of the vacuum line 598. A T-connection in the first vacuum line 600 branches off to a vacuum line 562 that exits through a housing 511 of the first supplemental distillation unit 510. The second supplemental distillation unit 520 includes a second vacuum line 602 coupled between the second end of the vacuum line 598 and the second vacuum port 582. The first and second vacuum ports 582, 596 also receive water vapor that is generated within the distillation tube 540.

Figure 16:
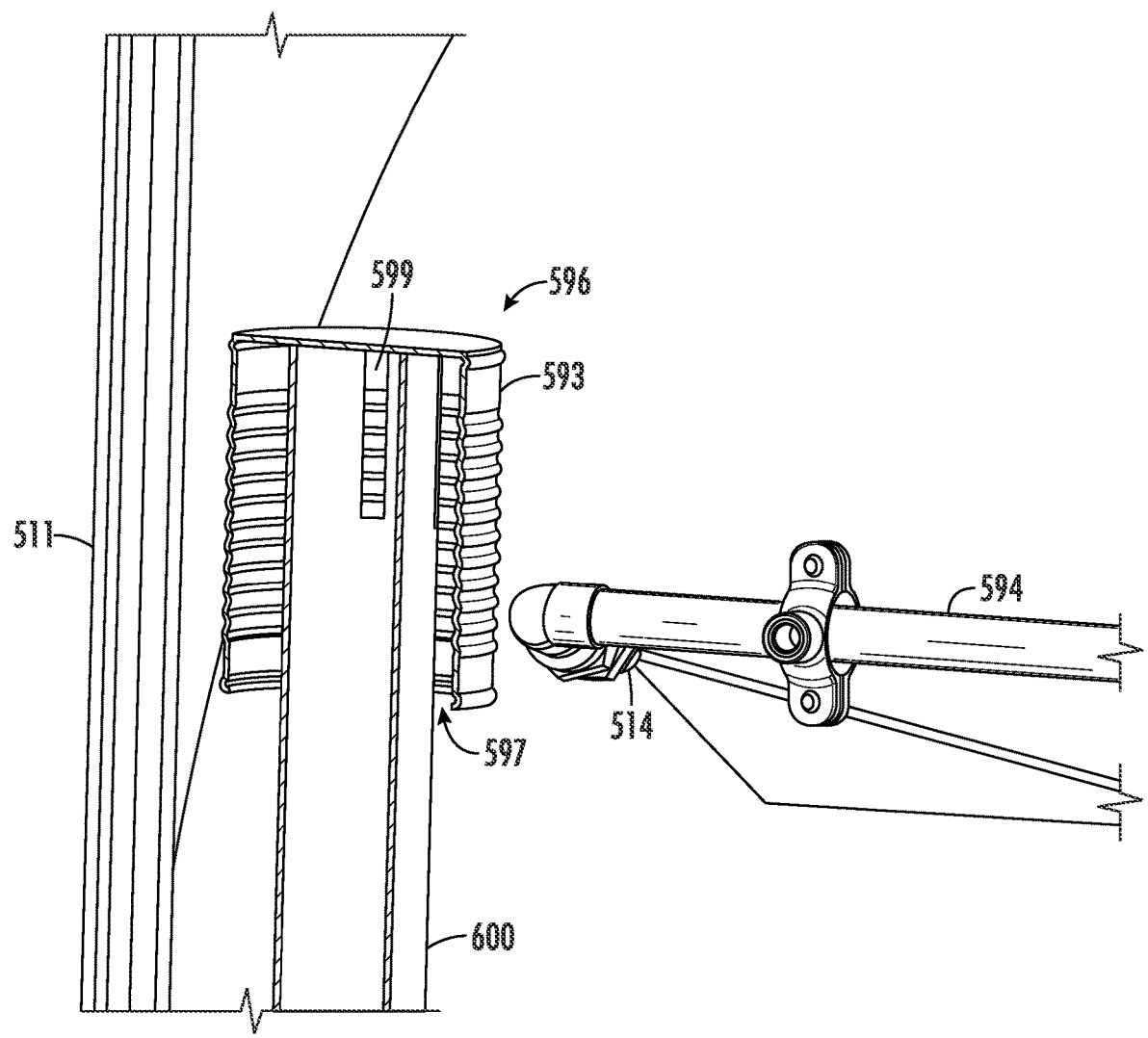
FIG. 16 is a cross-sectional perspective side view of one of the vacuum ports illustrated in FIG. 12.
Figure 17:
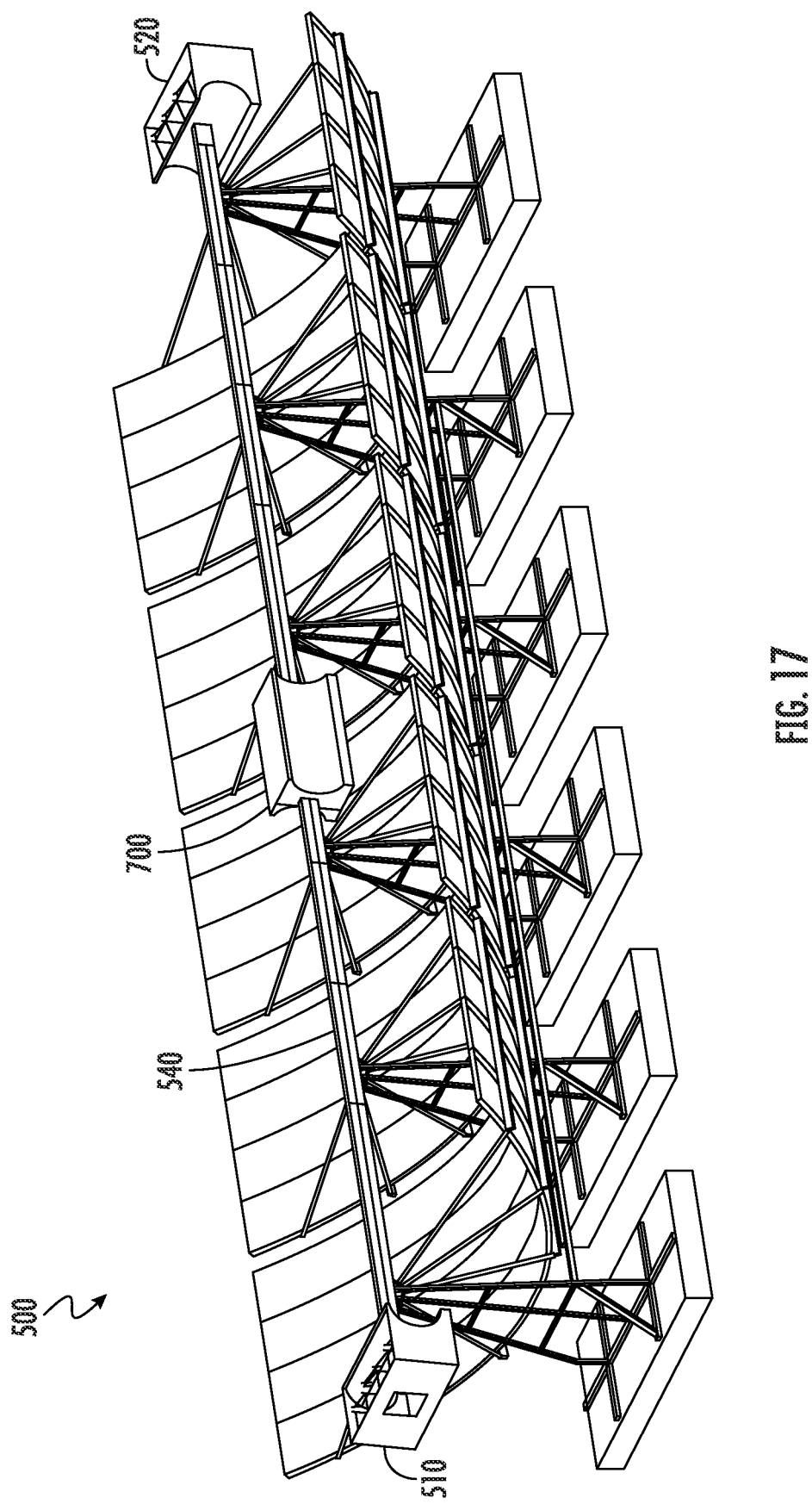
FIG. 17 is a perspective view of another embodiment of the solar distillation system illustrated in FIG. 12 with a third supplemental distillation unit in-line with the distillation tube.
Figure 18:
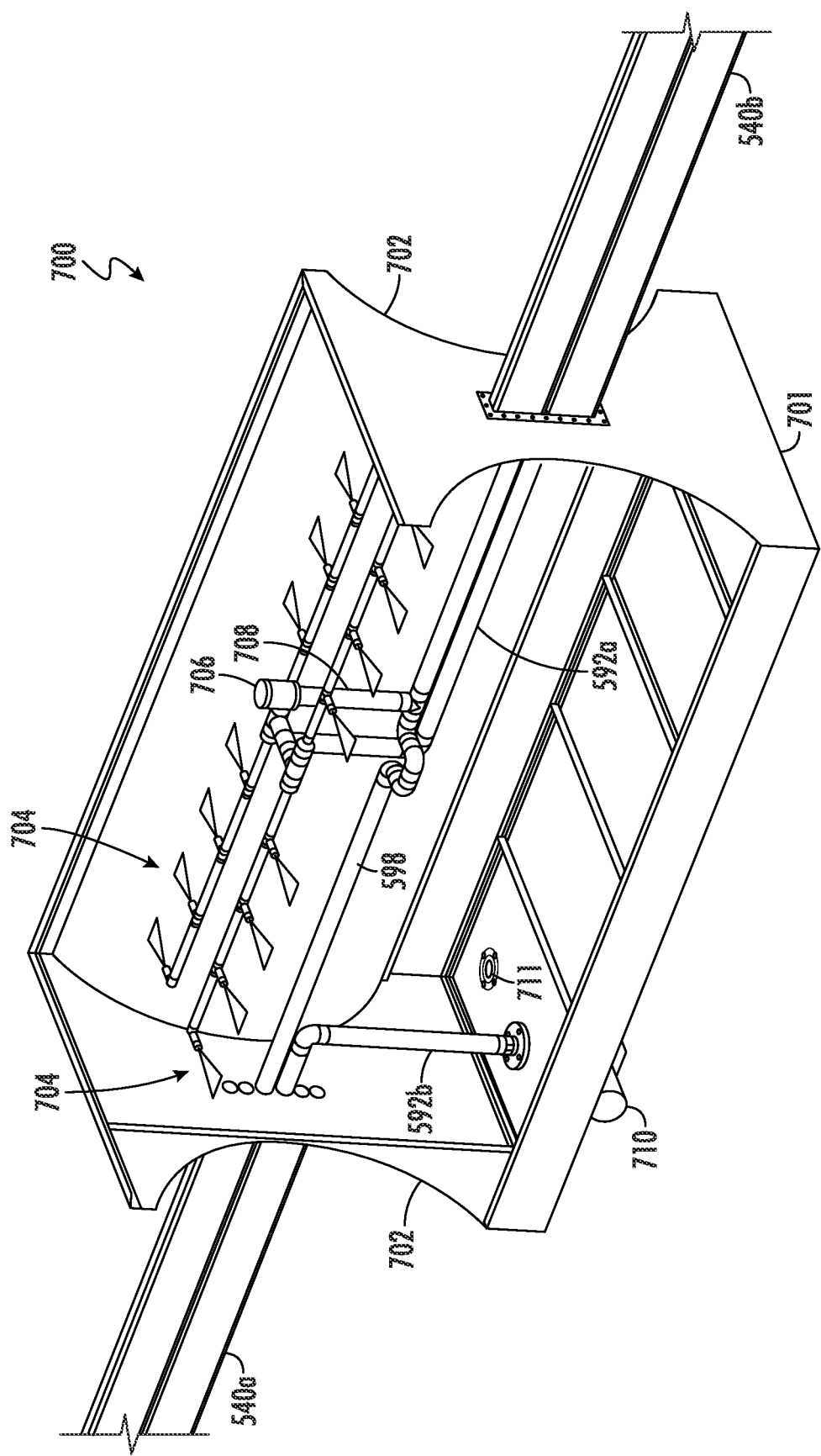
FIG. 18 is a sectional side perspective view of the third supplemental distillation unit illustrated in FIG. 17.
Figure 19:
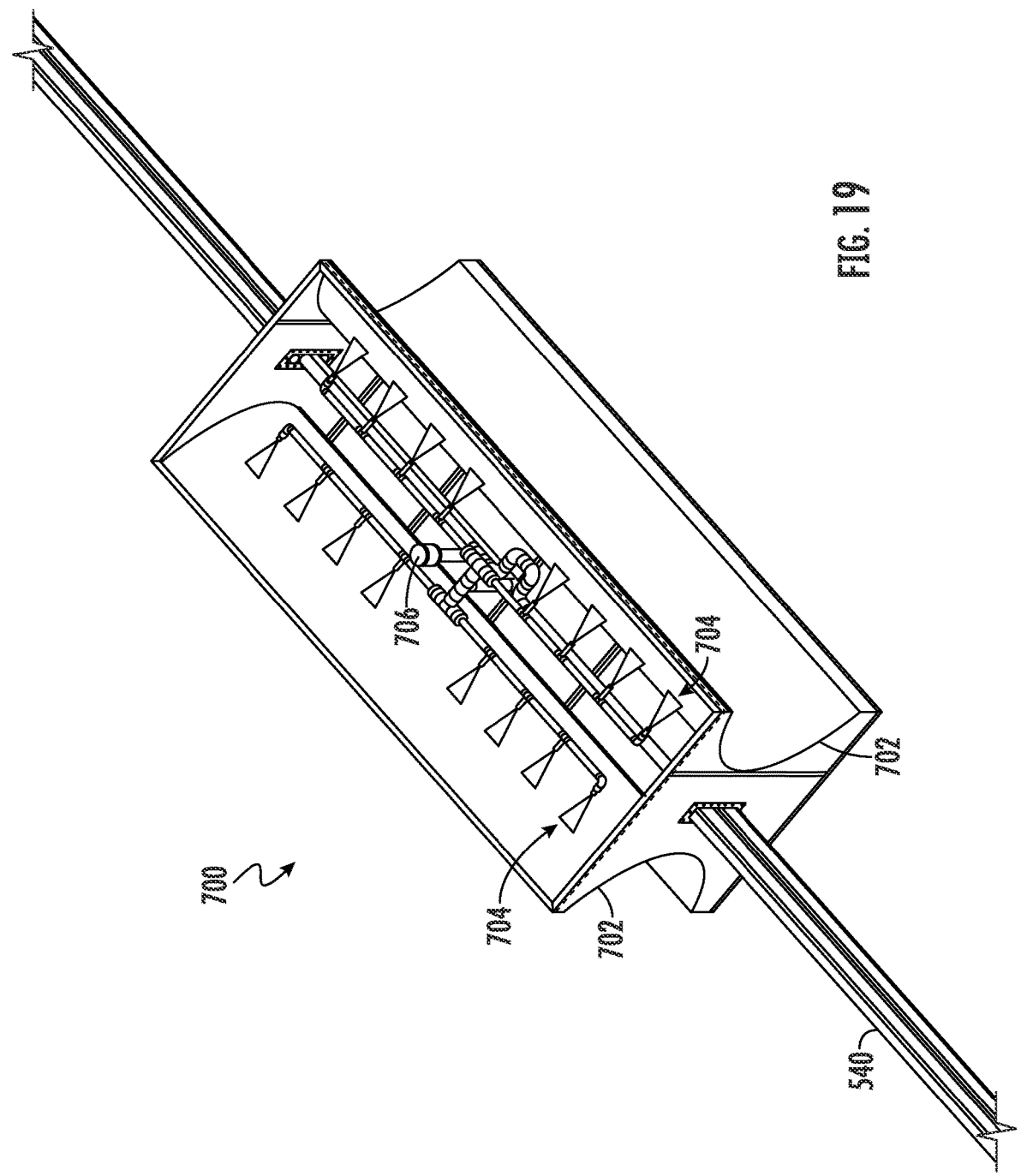
FIG. 19 is a sectional upper perspective view of the third supplemental distillation unit illustrated in FIG. 17.

Each vacuum port 582, 596 has a same snorkel-like configuration. Referring now to FIG. 16, a cross-sectional view of the first vacuum port 596 will be discussed. An end of the first vacuum line 600 terminates into a cylinder 593 having an open bottom. An underside of the closed top of the cylinder 593 is coupled to the end of the first vacuum line 600. The end of the first vacuum line 600 includes a plurality of spaced apart slits 599. The slits 599 are configured to receive the water vapor as it is being pulled in through opening 597. The opening 597 is formed between the sides of the cylinder 593 and first vacuum line 600.

Referring now to FIGS. 17-20, the solar distillation system 500 will be discussed with the addition at least one third supplemental distillation unit 700. Even though the illustrated embodiment includes a single third supplemental distillation unit 700, other embodiments may include a plurality of spaced apart third supplemental distillation units 700. As will be described in greater detail, the third supplemental distillation unit 700 increases the efficiency of processing brine into fresh water.

The distillation tube 540 extends in a longitudinal direction between the first and second supplemental distillation units 510, 520. The third supplemental distillation unit 700 is positioned inline with the distillation tube 540 and also extends in the longitudinal direction. The third supplemental distillation unit 700 has a pair of spaced apart curved surfaces 702 to receive the reflected sunlight, and has a plurality of sprayers 704 configured to spray brine onto the pair of spaced apart curved surfaces 702 to be further processed into fresh water.

As noted above, the brine flows through the distillation tube 540 between the first and second ends thereof. To accommodate the third supplemental distillation unit 700, there is a break in the distillation tube 540. A first portion 540a of the distillation tube 540 now extends from the first supplemental distillation unit 510 to the third supplemental distillation unit 700, and then a second portion 540b of the distillation tube 540 extends from the third supplemental distillation unit 700 to the second supplemental distillation unit 520. For additional third supplemental distillation units 700 there would be similar additional breaks in the distillation tube 540.

The brine flowing through the first portion 540a of the distillation tube 540 exits openings into a housing 701 of the third supplemental distillation unit 700. The brine fills up the third supplemental distillation unit 700 to the point where openings are aligned with the second portion 540b of the distillation tube 540 so that the brine continues to flow to the second supplemental distillation unit 520. The brine then flows through the second portion 540b of the distillation tube 540 and exits opening 570 into the second supplemental distillation unit 520.

As noted above, the recirculation line 592 is coupled to the second end of the distillation tube 540, and extends through the distillation tube 540 to the plurality of sprayers 514 in the first supplemental distillation unit 510. To accommodate the third supplemental distillation unit 700, there is a break in the recirculation line 592.

The recirculation line 592 now has a first portion 592a and a second portion 592b. The first portion 592a of the recirculation line 592 extends from the recirculation pump 590 to a plurality of sprayers 704 in the third supplemental distillation unit 700. The plurality of sprayers 704 spray brine onto the pair of spaced apart curved surfaces 702. Each curved surface 702 has a respective set of sprayers 704 associated therewith. The sprayers 704 atomize the brine into droplets which are to be vaporized when received by the respective curved surfaces 702 being heated by the reflected sunlight that would normally be received by the distillation unit 540.

The third supplemental distillation unit 700 includes a drain 711 for the brine to exit the housing 701 of the third supplemental distillation unit 700. A recirculation pump 710 is coupled to the drain 711. The second portion 592b of the recirculation line 592 is coupled to the recirculation pump 710 and to the first plurality of sprayers 514 in the first supplemental distillation unit 510. The recirculation pump 710 causes the brine to be sprayed onto the curved surface 512 in the first supplemental distillation unit 510.

As noted above, a vacuum line 592 extends between the first and second ends of the distillation tube 540 and through the third supplemental distillation unit 700. The third supplemental distillation unit 700 includes a third vacuum port 706 coupled to the vacuum line 598 to receive water vapor that is generated as the brine is heated in response to being sprayed onto the pair of spaced apart curved surfaces 702 receiving reflected sunlight. The third vacuum port 706 is coupled to the vacuum line 598 via vacuum line extension 708. A portion of the brine that is not vaporized is recirculated to the first plurality of sprayers 514 in the first supplemental distillation unit 510. The remaining portion of the brine flows into the trough 572 in the second supplemental distillation unit 510.

Figure 20:
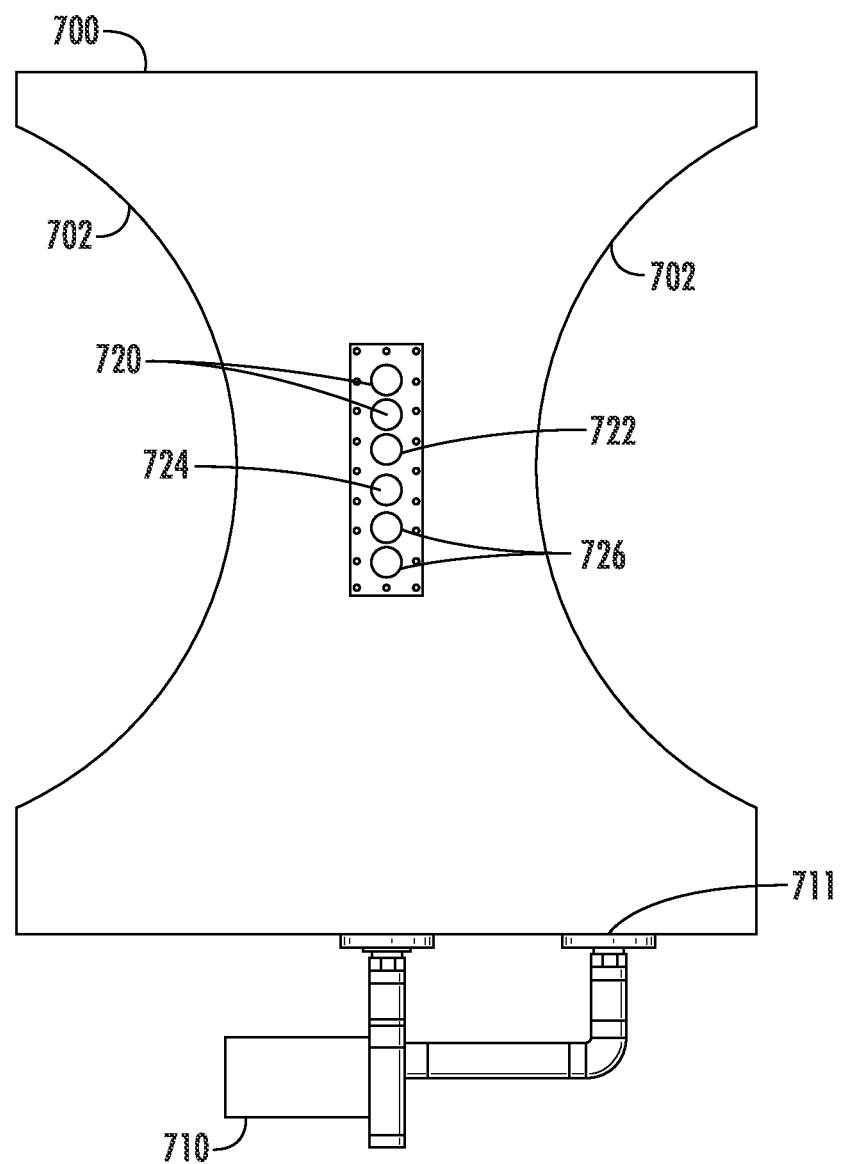
FIG. 20 is an end view of the third supplemental distillation unit illustrated in FIG. 17.

Each end of the third supplemental distillation unit 700 includes a plurality of openings 720-726 as illustrated in FIG. 20. The top two openings 720 are for water vapor, and the next adjacent opening 722 is for the vacuum line 598 that collects the water vapor that is condensed to fresh water. The next opening 724 is for the brine returning from the second supplemental distillation unit 520 to the first supplemental distillation unit 510. Depending on which end is being viewed, this opening 724 corresponds to the first portion 592a or the second portion 592b of the recirculation line 592. The bottom two openings 726 are for the brine flowing from the brine tank 550 through the first supplemental distillation unit 510 to the second supplemental distillation unit 520. The arrangement and positioning of the openings 720-726 are illustrative and are not to be limiting as other arrangements and positions may be used.

Figure 21:
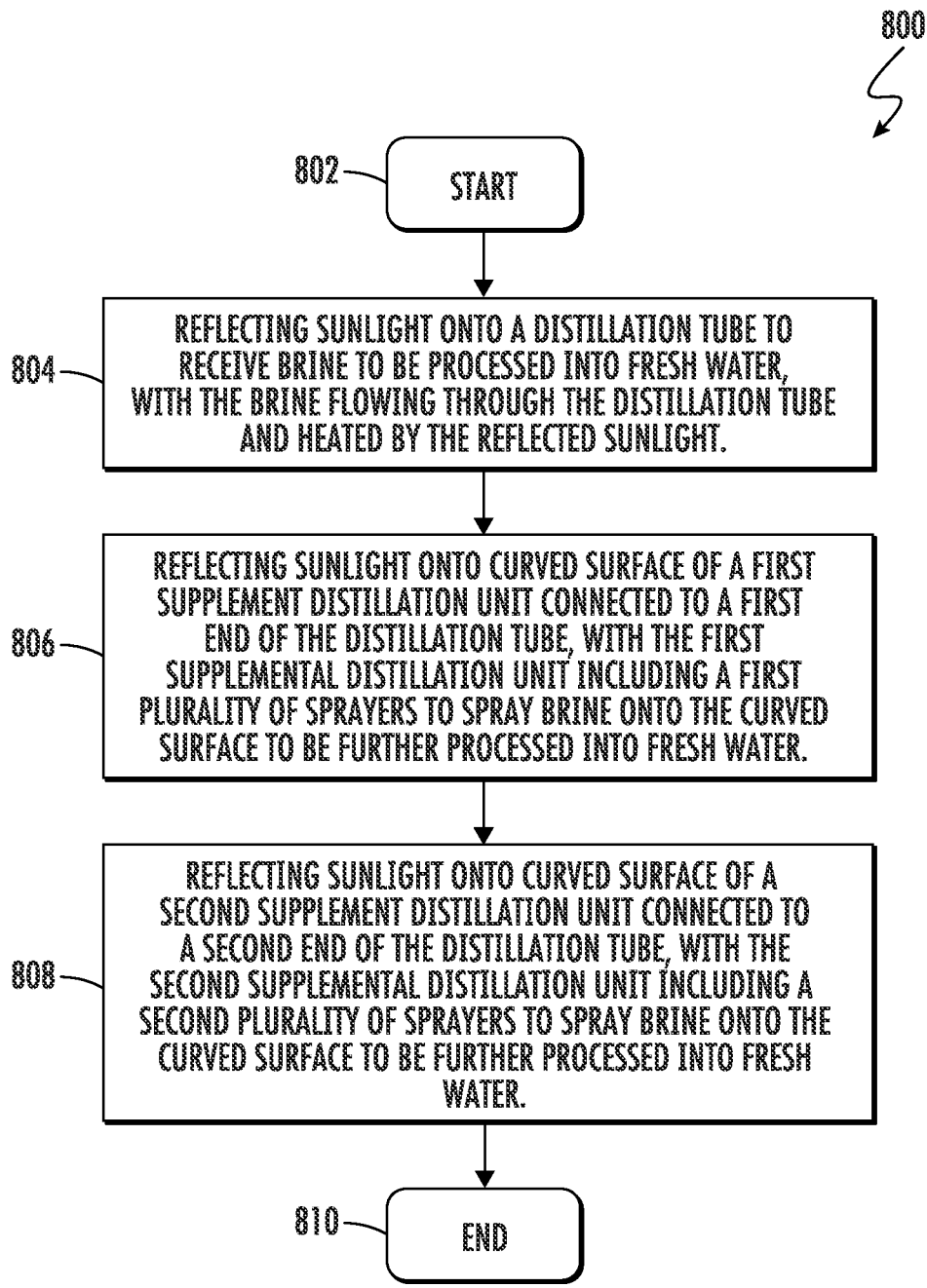
FIG. 21 is a flowchart illustrating a method for operating the solar distillation systems illustrated in FIGS. 12 and 17.

Referring now to FIG. 21, a flowchart 800 illustrating a method for operating the solar distillation system 500 will be discussed. From the start (Block 802), the method includes reflecting sunlight onto the distillation tube 540 at Block 804 which is configured to receive brine to be processed into fresh water. The brine flows through the distillation tube 540 and is heated by the reflected sunlight.

Sunlight is reflected onto a curved surface 512 of a first supplemental distillation unit at Block 806 which is connected to a first end of the distillation tube 540. The curved surface 512 is perpendicular to the distillation tube 540. The first supplemental distillation unit 510 includes a first plurality of sprayers 514 to spray brine onto the curved surface 512 to be further processed into fresh water.

Sunlight is reflected onto a curved surface 522 of a second supplemental distillation unit 520 at Block 808 which is connected to a second end of the distillation tube 540. The curved surface 522 is perpendicular to the distillation tube 540. The second supplemental distillation unit 520 includes a second plurality of sprayers 524 to spray brine onto the curved surface 522 to be further processed into fresh water. The method ends at Block 810.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A solar distillation system comprising:
   at least one solar panel configured to reflect sunlight;
   a distillation tube adjacent said at least one solar panel and configured to receive a liquid to be processed into fresh water, with the liquid flowing through said distillation tube and being heated by the reflected sunlight; and
   at least one supplemental distillation unit connected to said distillation tube and having at least one curved surface to receive the reflected sunlight, and comprising a plurality of sprayers separate from said distillation tube and configured to spray the liquid onto the at least one curved surface to be further processed into fresh water.

2. The solar distillation system according to claim 1 wherein the liquid comprises at least one of brine, sea water, oil field frac water or industrial waste water.

3. The solar distillation system according to claim 1 wherein said at least one supplemental distillation unit is comprises a first supplemental distillation unit connected to a first end of said distillation tube, with the at one least curved surface of said first supplemental distillation unit being perpendicular to said distillation tube to receive the reflected sunlight.

4. The solar distillation system according to claim 3 wherein said at least one supplemental distillation unit comprises a second supplemental distillation unit connected to a second end of said distillation tube, with the at least one curved surface of said second supplemental distillation unit being perpendicular to said distillation tube to receive the reflected sunlight.

5. The solar distillation system according to claim 4 further comprising a fresh water tank, and a vacuum pump coupled to said fresh water tank;
   said first supplemental distillation unit further comprising a first vacuum port coupled to said fresh water tank, said first vacuum port is to receive water vapor that is generated as the liquid is heated in response to being sprayed onto the at least one curved surface of said first supplemental distillation unit; and
   said second supplemental distillation unit further comprises a second vacuum port coupled to said fresh water tank, said second vacuum port is to receive water vapor that is generated as the liquid is heated in response to being sprayed onto the at least one curved surface of said second supplemental distillation unit.

6. The solar distillation system according to claim 5 wherein said distillation tube comprises a vacuum line having first and second ends extending between the first and second ends of said distillation tube;
said first supplemental distillation unit further comprising a first vacuum line coupled to the first vacuum port and to the first end of said vacuum line; and
said second supplemental distillation unit further comprising a second vacuum line coupled between the second end of said vacuum line and the second vacuum port.

7. The solar distillation system according to claim 5 wherein at least one of said first and second vacuum ports receives water vapor that is generated within said distillation tube.

8. The solar distillation system according to claim 4 wherein said second supplemental distillation unit further comprises:
a trough positioned to receive the liquid exiting the second end of said distillation tube, with the trough including a drain for the liquid to exit said trough; and
a sprayer pump coupled between the drain and said plurality of sprayers in said second supplemental distillation unit for causing the liquid to be sprayed onto the at least one curved surface of said second supplemental distillation unit.

9. The solar distillation system according to claim 8 wherein as the liquid fills said trough, excess liquid overflows from said trough to a lower portion of said second supplemental distillation unit.

10. The solar distillation system according to claim 4 wherein said second supplemental distillation unit further comprises:
a drain for the liquid to exit said second supplemental distillation unit;
a recirculation line within said second supplemental distillation unit and extending through said distillation tube and coupled to the plurality of sprayers in said first supplemental distillation unit; and
a recirculation pump coupled between the drain and said recirculation line for causing the liquid to be sprayed onto the at least one curved surface of said first supplemental distillation unit.

11. The solar distillation system according to claim 1 wherein said distillation tube extends in a longitudinal direction, and wherein said at least one supplemental distillation unit comprises a third supplemental distillation unit positioned inline with said distillation tube and extending in the longitudinal direction, and having a pair of spaced apart curved surfaces to receive the reflected sunlight, and comprising a plurality of sprayers configured to spray liquid onto the pair of spaced apart curved surfaces of said third supplemental distillation unit to be further processed into fresh water.

12. The solar distillation system according to claim 11 wherein said distillation tube comprises a vacuum line extending between first and second ends of said distillation tube, and wherein said third supplemental distillation unit further comprises a third vacuum port coupled to a vacuum line to receive water vapor that is generated as the liquid is heated in response to being sprayed onto the pair of spaced apart curved surfaces of said third supplemental distillation unit.

13. The solar distillation system according to claim 11 wherein said plurality of sprayers in said third supplemental distillation unit is coupled to a recirculation line extending through said distillation tube.

14. The solar distillation system according to claim 11 wherein said third supplemental distillation unit further comprises:
a drain for the liquid to exit said third supplemental distillation unit;
a recirculation line within said third supplemental distillation unit and extending through said distillation tube; and
a recirculation pump coupled between the drain and said recirculation line.

15. A method for operating a solar distillation system comprising:
reflecting sunlight onto a distillation tube configured to receive liquid to be processed into fresh water, with the liquid flowing through the distillation tube and being heated by the reflected sunlight; and
reflecting sunlight onto at least one supplemental distillation unit connected to the distillation tube and having at least one curved surface to receive the reflected sunlight, and comprising a plurality of sprayers separate from the distillation tube and configured to spray the liquid onto the at least one curved surface to be further processed into fresh water.

16. The method according to claim 15 wherein the at least one supplemental distillation unit comprises a first supplemental distillation unit connected to a first end of the distillation tube, with the at least one curved surface of the first supplemental distillation unit being perpendicular to the distillation tube to receive the reflected sunlight.

17. The method according to claim 16 wherein the at least one supplemental distillation unit comprises a second supplemental distillation unit connected to a second end of the distillation tube, with the at least one curved surface of the second supplemental distillation unit being perpendicular to the distillation tube to receive the reflected sunlight.

18. The method according to claim 17 wherein the solar distillation system further comprises a fresh water tank, and a vacuum pump coupled to the fresh water tank;
the first supplemental distillation unit further comprising a first vacuum port coupled to the fresh water tank, the first vacuum port is to receive water vapor that is generated as the liquid is heated in response to being sprayed onto the at least one curved surface of the first supplemental distillation unit; and
the second supplemental distillation unit further comprises a second vacuum port coupled to the fresh water tank, the second vacuum port is to receive water vapor that is generated as the liquid is heated in response to being sprayed onto the at least one curved surface of the second supplemental distillation unit.

19. The method according to claim 18 wherein the distillation tube comprises a vacuum line having first and second ends extending between the first and second ends of the distillation tube;
the first supplemental distillation unit further comprising a first vacuum line coupled to the first vacuum port and to the first end of the vacuum line; and
the second supplemental distillation unit further comprising a second vacuum line coupled between the second end of the vacuum line and the second vacuum port.

20. The method according to claim 17 wherein the second supplemental distillation unit further comprises:

a trough positioned to receive the liquid exiting the second end of the distillation tube, with the trough including a drain for the liquid to exit the trough; and a sprayer pump coupled between the drain and the plurality of sprayers in the second supplemental distillation unit for causing the liquid to be sprayed onto the at least one curved surface of the second supplemental distillation unit.

21. The method according to claim 15 wherein the distillation tube extends in a longitudinal direction, and wherein the at least one supplemental distillation unit comprises a third supplemental distillation unit positioned inline with the distillation tube and extending in the longitudinal direction, and having a pair of spaced apart curved surfaces to receive the reflected sunlight, and comprising a plurality of sprayers configured to spray liquid onto the pair of spaced apart curved surfaces of the third supplemental distillation unit to be further processed into fresh water.

* * * * *